(12) United States Patent
Kawaguchi

(10) Patent No.: US 11,619,579 B2
(45) Date of Patent: Apr. 4, 2023

(54) IDENTIFICATION APPARATUS

(71) Applicant: CANON KABUSHIKI KAISHA, Tokyo (JP)

(72) Inventor: Makoto Kawaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/387,381

(22) Filed: Jul. 28, 2021

(65) Prior Publication Data
US 2022/0034800 A1    Feb. 3, 2022

(30) Foreign Application Priority Data
Jul. 29, 2020   (JP) .............................. JP2020-128162

(51) Int. Cl.
| G01N 21/35 | (2014.01) |
| G01N 21/3563 | (2014.01) |
| B07C 5/342 | (2006.01) |
| G01J 3/10 | (2006.01) |
| G01N 21/65 | (2006.01) |

(52) U.S. Cl.
CPC ....... *G01N 21/3563* (2013.01); *B07C 5/3427* (2013.01); *G01J 3/108* (2013.01); *G01N 21/65* (2013.01)

(58) Field of Classification Search
CPC .. G01N 21/3563; G01N 21/65; B07C 5/3427; G01J 3/108
See application file for complete search history.

(56) References Cited

U.S. PATENT DOCUMENTS

| 6,313,423 B1 | 11/2001 | Sommer | |
| 2013/0155402 A1* | 6/2013 | Walton | G01J 3/2803 |
| | | | 356/326 |
| 2014/0367316 A1* | 12/2014 | Saeedkia | B07C 5/3416 |
| | | | 250/341.1 |
| 2020/0292389 A1 | 9/2020 | Yonetani | |

FOREIGN PATENT DOCUMENTS

| JP | 2001 198529 A | 7/2001 |
| JP | 2002323450 A | 11/2002 |
| JP | 2013 127422 A | 6/2013 |
| JP | 2014141045 A | 8/2014 |
| WO | 2019/111784 A1 | 6/2019 |

* cited by examiner

*Primary Examiner* — Hugh Maupin
(74) *Attorney, Agent, or Firm* — Canon U.S.A., Inc., IP Division

(57) ABSTRACT

An identification apparatus includes a plurality of irradiation units disposed at different positions in a conveyance width direction to irradiate a specimen with a converging ray in different irradiation conditions, the specimen being conveyed in a predetermined conveyance direction by a conveyance unit, a plurality of light-capturing units configured to capture scattered light from the specimen, each of the plurality of light-capturing units corresponding to a different one of the plurality of irradiation units, an acquisition unit configured to acquire identification information for identifying a property of the specimen, based on the light captured by the light-capturing units; and a placement unit configured to place the specimen on a position corresponding to any one of the plurality of irradiation units in accordance with a characteristic value of the specimen at an upstream side of the plurality of irradiation units in the conveyance direction.

23 Claims, 10 Drawing Sheets

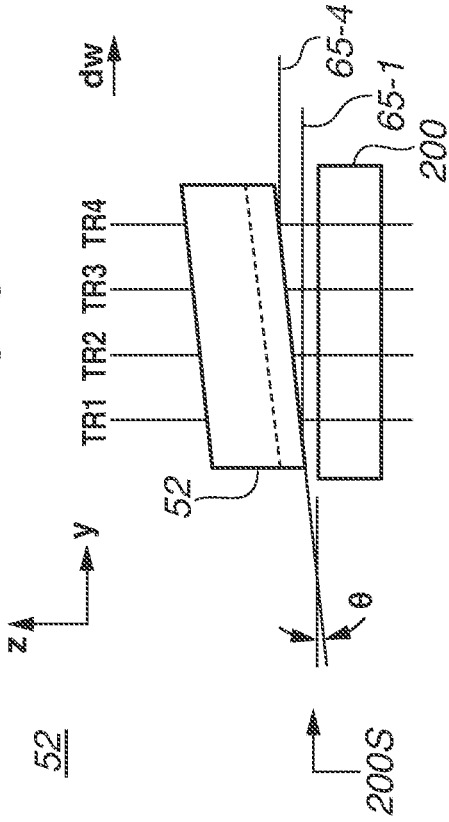
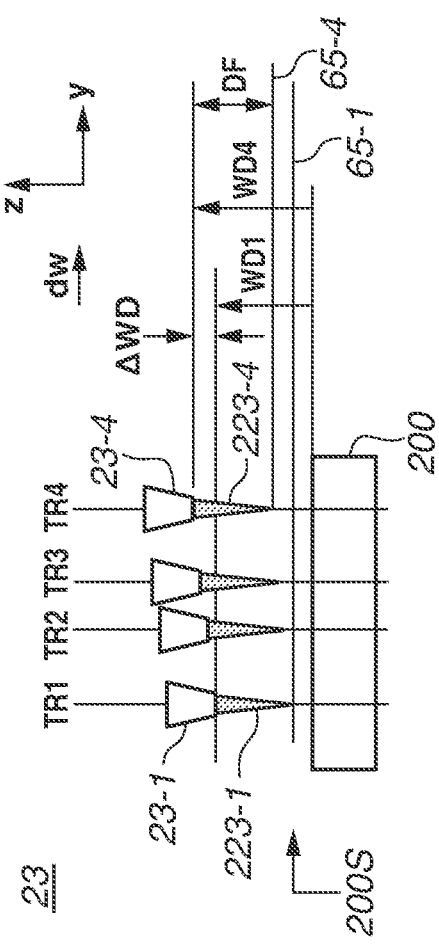
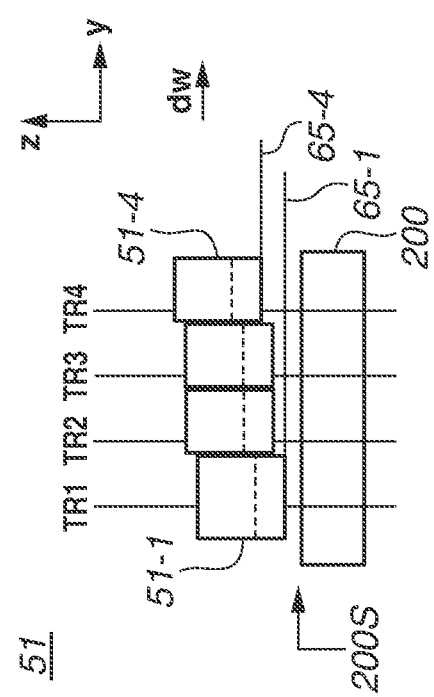
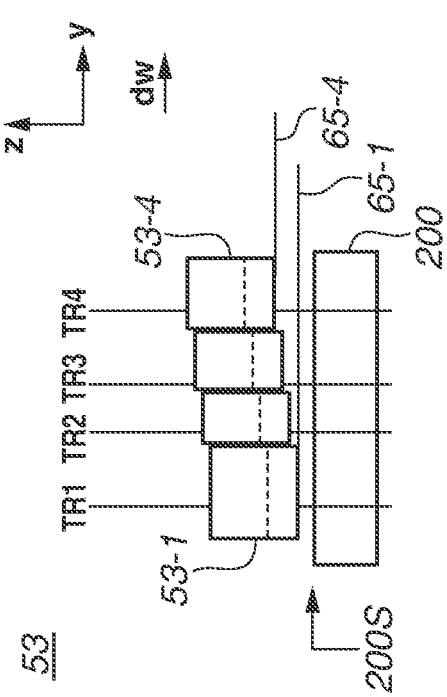

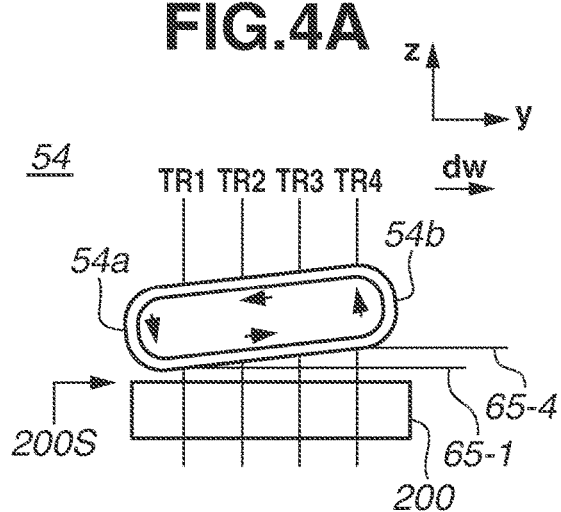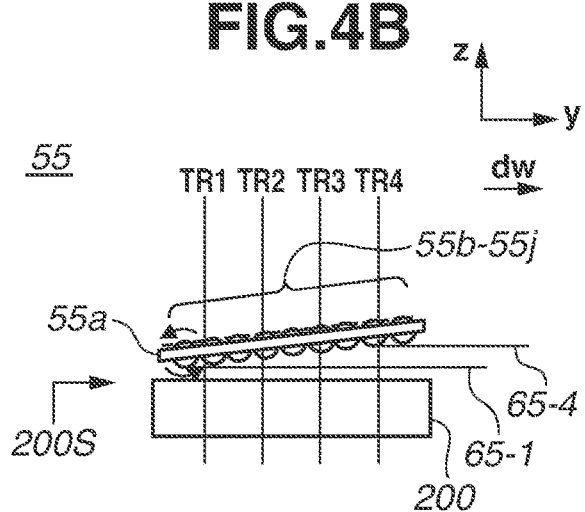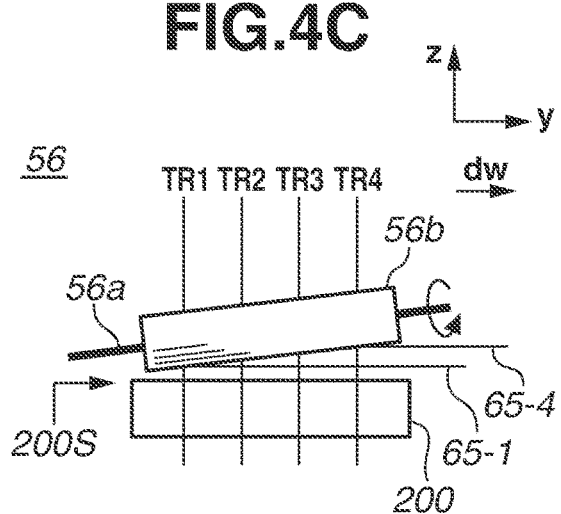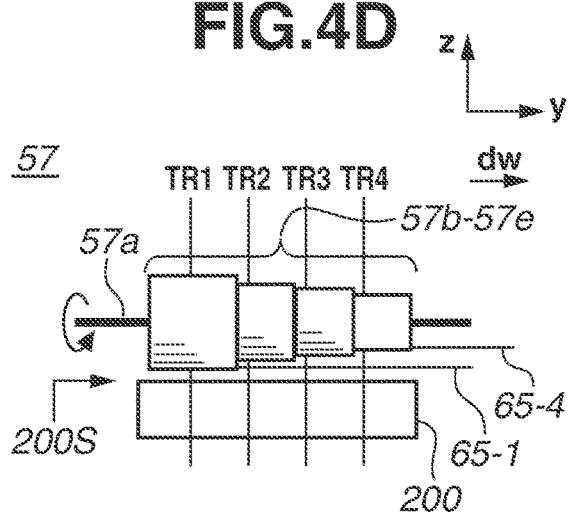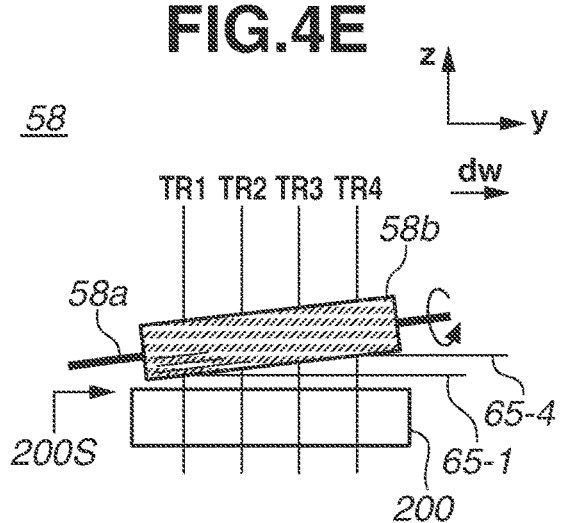

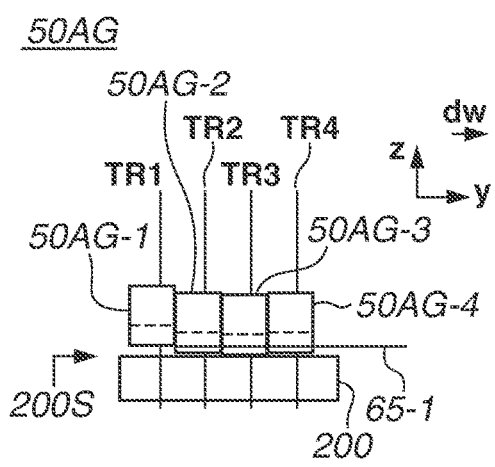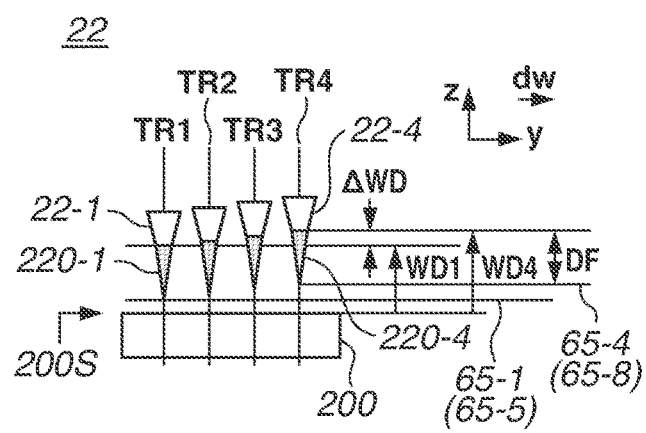

IDENTIFICATION APPARATUS

BACKGROUND

Field of the Disclosure

The present disclosure relates to an identification apparatus that identifies a property of a specimen.

Description of the Related Art

An identification apparatus that optically identifies a property of a specimen using a spectroscopic analysis is known. Such an identification apparatus is disposed in the middle of a conveyance portion on which specimens are conveyed and is used for, for example, inspection of a product or sorting of waste. The spectroscopic analysis does not necessarily involve processes, which cause reduction in throughput of analysis, such as a vacuum decomposition process, an atmosphere control process, a liquid immersion treatment process, and a drying process, and the spectroscopic analysis makes it possible to identify a property of each specimen in the atmosphere. In view of such advantages, the application of the spectroscopic analysis to sorting of resins in waste has recently been attempted.

In the spectroscopic analysis, absorption spectroscopy for acquiring a light absorption spectrum of a specimen with respect to incident light, and scattering spectroscopy for acquiring a scattering spectrum of a specimen with respect to incident light are known. The scattering spectroscopy is less affected by an optical attenuation in a thickness direction of a specimen and thus is used to identify waste including various specimen sizes and various material contents. Raman scattering spectrometry for dispersing Raman scattered light uses a specific Raman shift in binding of atoms constituting a hydrocarbon or the like and thus is favorably used to identify resins.

A sorting apparatus for sorting identified specimens based on whether a property of each specimen satisfies a predetermined target condition by referring to the predetermined target condition is known.

Raman scattered light for Raman scattering spectrometry has an intensity that is a few orders of magnitude lower than that of elastic scattering components (Rayleigh scattered light) included in secondary light. Accordingly, a method for condensing the primary light as the converging ray and irradiating each specimen with the light is employed to increase a detection sensitivity per unit area. In such a light condensing method, sensitivity enhancement effect can be obtained, while the identification performance varies due to a variation in the intensity of detection light in accordance with a variation in a working distance that is a distance between a light irradiation member and an irradiation surface (detection surface) of each specimen. To relieve variations in the intensity of detection light and the identification performance, it may be desirable to maintain a constant working distance in scattering spectrometry.

Japanese Patent Application Laid-Open No. 2002-323450 discuses an identification apparatus in which a conveyance unit that conveys aligned specimens, an identification unit that identifies a material contained in each specimen based on scattered light from each of the conveyed specimens, a guide mechanism, and a translucent plate are provided to maintain a constant distance (working distance) between each specimen and a light irradiation member. Japanese Patent Application Laid-Open No. 2002-323450 discusses a technique in which scattered light from a specimen that is pressed against the translucent plate by the guide mechanism is received through the translucent plate, to keep the working distance at a predetermined value.

An identification apparatus configured to stabilize a working distance by keeping a constant distance between each specimen to be conveyed and a light irradiation member is known. Japanese Patent Application Laid-Open No. 2014-141045 discusses an identification apparatus that includes a pressing portion, which is disposed with a gap parallel to a conveyor belt at an upstream side of a light-capturing portion for capturing Raman scattered light, and optically identifies each specimen at a working distance with a predetermined variation or less. The pressing portion included in the identification apparatus discussed in Japanese Patent Application Laid-Open No. 2014-141045 reduces the variation in the working distance to the predetermined variation or less by pressurizing and fabricating each specimen on a conveyance surface or by laying each specimen on the conveyance surface.

SUMMARY

In the identification apparatus that adopts the configuration of the guide mechanism for pressing a specimen as discussed in Japanese Patent Application Laid-Open No. 2002-323450 and the configuration of the pressing portion as discussed in Japanese Patent Application Laid-Open No. 2014-141045, since there is a concern that some specimens can be caught on the guide mechanism or the pressing portion, the number of identification processes is limited, and some specimens can be elastically deformed, which causes a variation in the position of a light irradiation surface.

The present disclosure is directed to providing an identification apparatus or an identification method in which a distance (working distance) between a light detection surface and a light irradiation member is stabilized even in a case where specimens to be conveyed have different sizes or shapes, so that a decrease in the number of inspection processes and deterioration in identification accuracy are less likely to occur. In other words, the present disclosure is directed to providing an identification apparatus or an identification method in which variations in the distance between the light detection surface and the light irradiation member can be reduced even in a case where specimens to be conveyed have different sizes or shapes, so that a decrease in the number of inspection processes and deterioration in identification accuracy are less likely to occur.

According to an aspect of the present invention, an identification apparatus includes a plurality of irradiation units disposed at different positions in a conveyance width direction to irradiate a specimen with a converging ray in different irradiation conditions, the specimen being conveyed in a predetermined conveyance direction by a conveyance unit, a plurality of light-capturing units configured to capture scattered light from the specimen, each of the plurality of light-capturing units corresponding to a different one of the plurality of irradiation units, an acquisition unit configured to acquire identification information for identifying a property of the specimen, based on the light captured by the light-capturing units; and a placement unit configured to place the specimen on a position corresponding to any one of the plurality of irradiation units in accordance with a characteristic value of the specimen at an upstream side of the plurality of irradiation units in the conveyance direction.

Further features of the present invention will become apparent from the following description of exemplary embodiments with reference to the attached drawings.

BRIEF DESCRIPTION OF THE DRAWINGS

FIGS. 3A to 3C are diagrams each illustrate a modified example of a placement unit according to the first exemplary embodiment. FIG. 3D is a diagram illustrating a modified example of an irradiation member.

FIGS. 4A to 4E are diagrams each illustrating another modified example of the placement unit according to the first exemplary embodiment.

FIGS. 6A to 6D are diagrams each illustrating a schematic configuration of an identification apparatus according to a third exemplary embodiment.

DESCRIPTION OF THE EMBODIMENTS

Exemplary embodiments of the present invention will be described below with reference to the drawings.

Figure 1A:
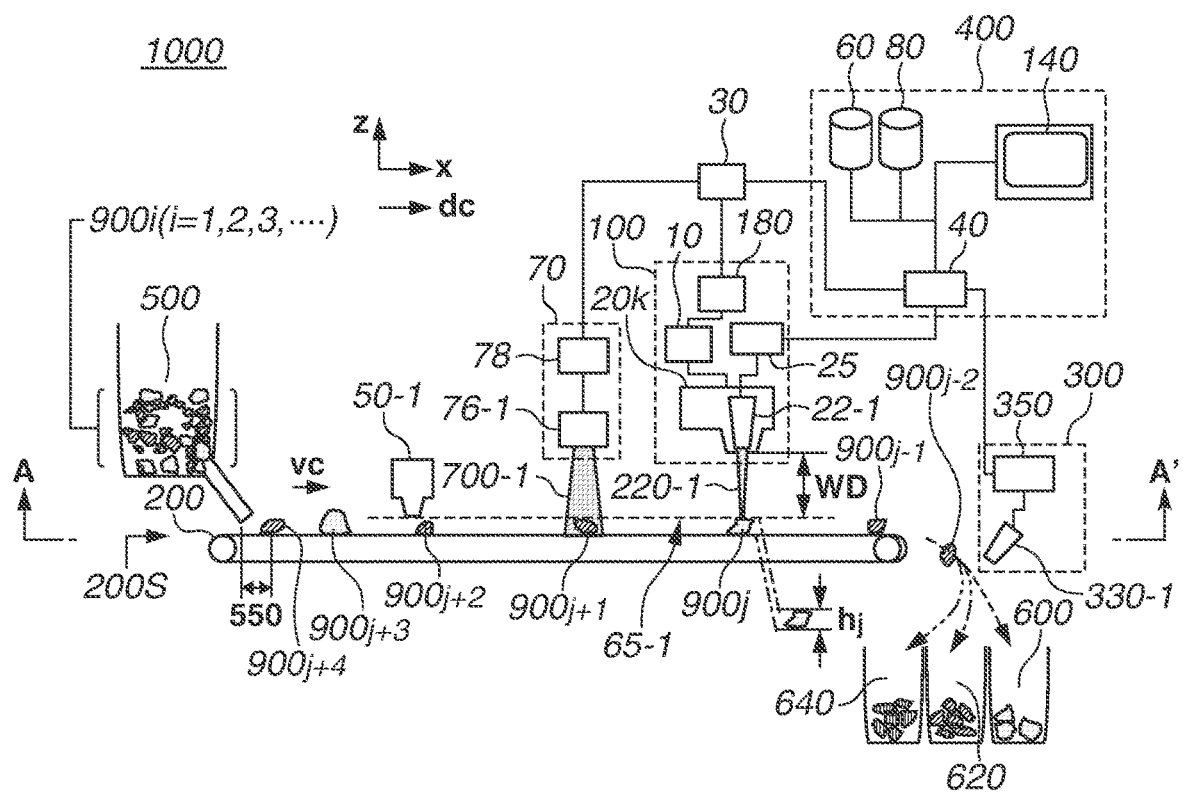
FIGS. 1A to 1D are diagrams each schematically illustrating a configuration example of an identification apparatus according to a first exemplary embodiment.
Figure 1B:
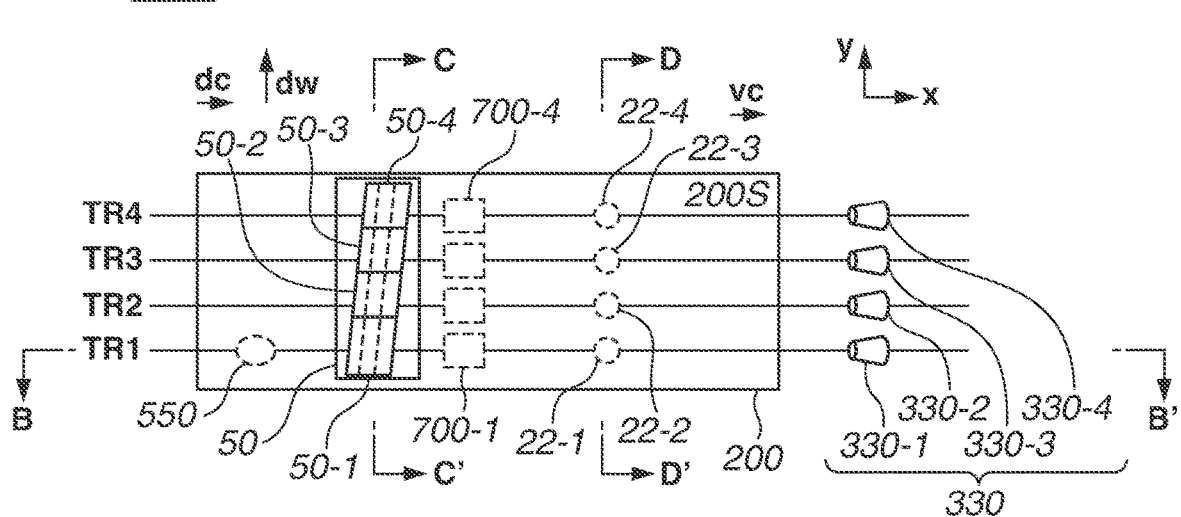
Figure 1C:
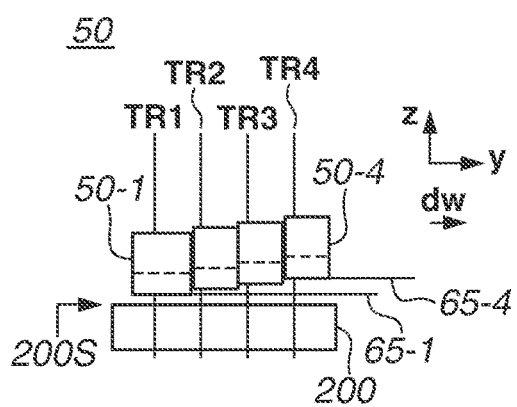
Figure 1D:
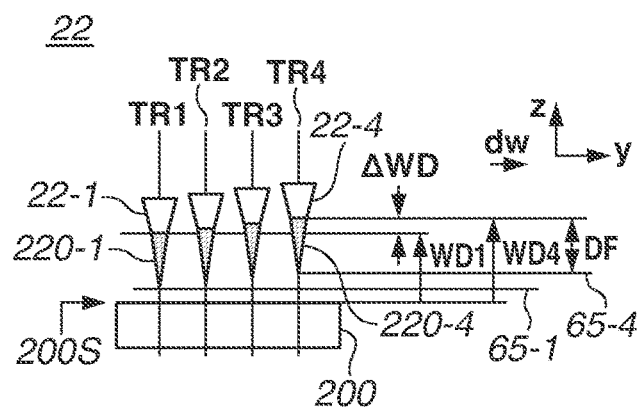

An identification apparatus 1000 according to a first exemplary embodiment will be described with reference to FIGS. 1A to 1D, FIG. 2, and FIGS. 3A to 3D. FIG. 1A schematically illustrates a configuration example of the identification apparatus 1000 according to the present exemplary embodiment. FIG. 1B is a plan view of the identification apparatus 1000 illustrated in FIG. 1A as viewed from a positive side in a z-direction. FIG. 1C illustrates a schematic configuration of a placement unit 50 according to the present exemplary embodiment as viewed in a negative direction from a positive side of an x-axis. FIG. 1D illustrates a schematic configuration of an irradiation member 22 according to the present exemplary embodiment as viewed in the negative direction from the positive side of the x-axis. FIGS. 1A, 1C, and 1D correspond to a section B-B', a section C-C', and a section D-D', respectively, which are illustrated in FIG. 1B.

In the present exemplary embodiment, a -z-direction corresponds to each of a vertical direction and a gravitational direction, an x-direction corresponds to a conveyance direction dc, a y-direction corresponds to a conveyance width direction dw, and an x-y plane corresponds to a horizontal plane. The conveyance width direction dw is parallel to a conveyance surface 200S and coincides with the direction perpendicular to the conveyance direction dc.

(Identification Apparatus)

As illustrated in FIGS. 1A, 1B, and 1D, the identification apparatus 1000 includes a plurality of irradiation members 22-$k$ (k: 1 to 4) that irradiate specimens 900$i$ to be conveyed in the conveyance direction dc with converging rays 220-$k$ (k: 1 to 4) with different heights of focal planes 65-$k$ (k: 1 to 4). The plurality of irradiation members 22-$k$ (k: 1 to 4) is disposed at different positions in the conveyance width direction dw, to correspond to conveyance tracks TRk (k: 1 to 4), respectively. The height of each of the focal planes 65-$k$ (k: 1 to 4) is included in irradiation conditions for the plurality of irradiation members 22-$k$ (k: 1 to 4). Each specimen 900$i$ is supplied to a conveyance unit 200 by a feeder 500 and is conveyed along the conveyance direction dc by the conveyance unit 200.

The irradiation conditions include at least one of the height of each of the focal planes 65-$k$ (k: 1 to 4), an irradiation light intensity i, an irradiation period, a focal length DF, and a working distance WD between the irradiation units 22-$k$. Each conveyance track TRk can also be referred to as the conveyance path TRk.

As illustrated in FIG. 1A, the identification apparatus 1000 includes a plurality of light-capturing members 20-$k$ (k: 1 to 4) that are disposed at different positions in the conveyance width direction dw and capture scattered light from each specimen 900$i$. The plurality of light-capturing members 20-$k$ corresponds to the plurality of irradiation members 22-$k$ (k: 1 to 4), respectively. As illustrated in FIG. 1A, the identification apparatus 1000 also includes an acquisition unit 30 that acquires identification information for identifying a property of each specimen 900$i$ based on light captured by the light-capturing members 20-$k$ (k: 1 to 4). In a mode in which an arrangement relationship between the irradiation units 22-$k$ and the light-capturing members 20-$k$ included in a light-capturing unit 27 to be described below is commonly set among the conveyance tracks TRk, the height of each focal plane 65-$k$ can be replaced by other expressions, such as the height of each detection surface 65-$k$ or the height of an irradiated surface 65$k$ of each specimen 900$i$.

As illustrated in FIGS. 1A, 1B, and 1C, the identification apparatus 1000 also includes the placement unit 50 on which each specimen 900$i$ is placed at a position corresponding to any one of the plurality of irradiation members 22-$k$ (k: 1 to 4) in accordance with a height hi of the specimen 900$i$. The placement unit 50 according to the present exemplary embodiment includes a plurality of gap gates 50-$k$ (k: 1 to 4) that are disposed at an upstream side of the plurality of irradiation members 22-$k$ (k: 1 to 4) in the conveyance direction dc and have different gaps (gap heights), respectively, from the conveyance surface 200S.

In the present exemplary embodiment, the position where each specimen 900$i$ is placed on the placement unit 50 to correspond to any one of the plurality of irradiation members 22-$k$ (k: 1 to 4) is determined depending on a characteristic value of the specimen 900$i$. In the present exemplary embodiment, the height hi of each specimen 900$i$ is used as the characteristic value and the characteristic value is included in a geometric characteristic of the specimen 900$i$.

The type of the characteristic value is not limited to the geometric characteristic, but instead other characteristics may be adopted in place of the geometric characteristic. Examples of the characteristic value based on which the position of each specimen 900$i$ on the placement unit 50 is determined include a geometric characteristic, a mechanical characteristic, and an optical characteristic. The geometric characteristic includes at least one of an outer shape, including a size and an aspect ratio, a surface roughness, a specific gravity, and a mass of each specimen 900$i$. The mechanical characteristic includes at least one of a modulus of elasticity, a viscosity, a linear expansion coefficient, a Poisson ratio, a rigidity, a stress, and a distortion distribution of each specimen 900$i$. The optical characteristic includes at least one of a spectral reflectance including a reflection spectrum, a haze value, a refractive index, and an optical density of the specimen 900$i$.

As illustrated in FIGS. 1A and 1B, the identification apparatus 1000 also includes a conveyance unit 200 including a conveyor belt for conveying each specimen 900$i$ in the x-direction at a conveyance speed vc, and a sorting device 300 that is disposed at a downstream side in the conveyance direction dc of the conveyance unit 200. The plurality of irradiation members 22-$k$ (k: 1 to 4), the plurality of light-capturing members 20-$k$ (k: 1 to 4), and the plurality of gap gates 50-$k$ (k: 1 to 4), which are provided corresponding to the respective conveyance tracks TR$k$ (k: 1 to 4), are collectively referred to as the irradiation unit 22, the light-capturing member 20, and the placement unit 50, respectively.

Next, components included in the identification apparatus 1000 will be described in detail.

(Spectroscopic Information Acquisition Unit)

The identification apparatus 1000 includes a spectroscopic information acquisition unit 100 that acquires spectroscopic information in association with light captured from each specimen 900$i$. The spectroscopic information acquisition unit 100 is a unit that acquires a Raman shift based on a wave number difference between Raman scattered light included in secondary light from each specimen 900$i$ and excitation light included in primary light from the specimen 900$i$.

Figure 2:
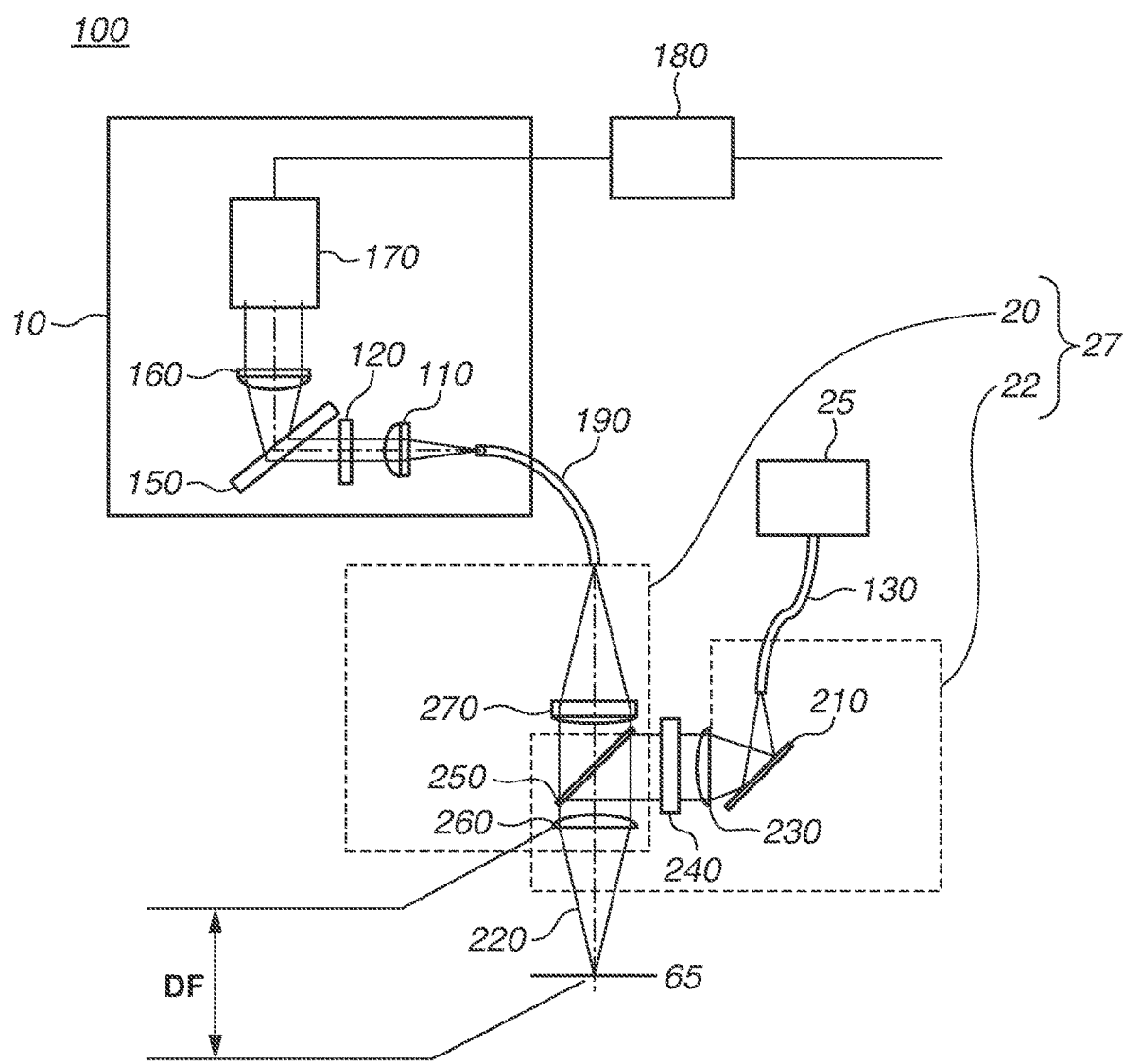
FIG. 2 is a diagram schematically illustrating a configuration example of a spectroscopic information acquisition unit according to the first exemplary embodiment.

As illustrated in FIGS. 1A and 2, the spectroscopic information acquisition unit 100 includes the irradiation unit 22 that irradiates each specimen 900$i$ with a converging ray 220, and the light-capturing member 20 that captures the secondary light from the specimen 900$i$. The irradiation unit 22 and the light-capturing member 20 according to the present exemplary embodiment are coaxially disposed and the irradiation unit 22 is optically coupled to a light source 25 including a laser light source, via an optical fiber 190. The light-capturing member 20 is optically coupled to a spectral image acquisition unit 10 so that the spectroscopic information acquisition unit 100 can acquire optical information in association with light reflected on a material contained in the specimen 900$i$.

(Light-Capturing Unit)

FIG. 2 schematically illustrates a configuration example of the spectroscopic information acquisition unit 100. The spectroscopic information acquisition unit 100 includes the light-capturing unit 27 including the irradiation unit 22 that irradiates each specimen 900$i$ with light and the light-capturing member 20 that captures Raman scattered light from the specimen 900$i$. The irradiation unit 22 and the light-capturing member 20 are coaxially disposed on a specimen side (objective side) as viewed from a dichroic mirror. Even in a case where an irradiation surface of each specimen 900$i$ has a difference in height or is tilted, misregistration between the center of an irradiation spot and the center of a light flux of scattered light to be captured is less likely to occur.

(Irradiation Members)

As illustrated in FIGS. 1B and 1D, the irradiation unit 22 includes a plurality of irradiation members 22-1 to 22-4. The plurality of irradiation members 22-1 to 22-4 corresponds to the conveyance tracks TR1 to TR4, respectively, and is disposed above the conveyance unit 200 at predetermined distances WD-1 to WD-4, respectively, which are different from each other, from the conveyance surface 200S of the conveyor belt.

The irradiation units 22-1 to 22-4 are disposed to focus converging rays 220-1 to 220-4 on an upper surface of each specimen 900$i$, to increase the scattering intensity of Raman scattered light that is a few orders of magnitude lower than that of Rayleigh scattered light. A unit including the irradiation unit 22 and the light source 25 can also be referred to as an irradiation optical system. Some of reference symbols denoting the focal planes 65-$k$ in FIGS. 1B to 1D, FIGS. 3A to 3D, FIGS. 4A to 4E, FIGS. 5A to 5C, FIG. 6D, and FIG. 8B, each illustrating a plurality of elements arranged in the conveyance width direction dw are omitted for ease of understanding.

As illustrated in FIG. 2, the irradiation unit 22 includes an objective lens 260, a dichroic mirror 250, a collimator lens 230, a cylindrical lens 240, and a reflection mirror 210. As the objective lens 260, for example, a convex lens, a collimator lens, a concave lens, or a zoom lens can be adopted.

Synthetic quartz can be used as a glass material for the collimator lens 230, the cylindrical lens 240, the objective lens 260, and the like. These lenses are irradiated with high-output light from the light source 25. The use of a lens made of synthetic quartz as a glass material makes it possible to reduce background components of fluorescence or Raman scattered light.

In the irradiation unit 22, the objective lens 260 acts as a condenser lens that focuses light from the light source 25 on each specimen 900$i$. The objective lens 260 forms the focal plane 65, a focal point (focal spot) with a focus diameter φ (not illustrated), and a depth of focus ΔDF at a position that is apart from the objective lens 260 by the focal length DF and corresponds to a numerical aperture NA. The collimator lens 230 and the cylindrical lens 240 shape emitted light from the light source 25 into parallel light by reducing spreading of the emitted light. As the cylindrical lens 240, other collimating optical elements, such as an anamorphic prism pair, may also be used. In the irradiation unit 22, a wavelength filter, such as a laser line filter, may be disposed at a position corresponding to a pupil surface of the irradiation unit 22. With this configuration, the wavelength characteristic of light irradiated on each specimen 900$i$ by the irradiation unit 22 can be improved.

As illustrated in FIG. 2, at least a part of the irradiation unit 22 can be shared with the light-capturing member 20. Since the light-capturing member 20 and the irradiation unit 22 according to the present exemplary embodiment are coaxially disposed, the objective lens 260 and the dichroic mirror 250 are shared with the light-capturing member 20 and the irradiation unit 22.

(Light Source)

The light source 25 is a light source that emits excitation light to the irradiation unit 22 via the optical fiber 190. In the irradiation optical system for dispersing Raman scattered light, a laser light source with a wavelength ranging from 400 to 1100 nm is used as the light source 25. In Raman scattering, the excitation efficiency increases as the wavelength decreases, and fluorescence components serving as background components are reduced as the wavelength increases.

As the excitation wavelength of the laser light source applied as the light source 25, it may be desirable to select a wavelength with which a clear difference in a Raman shift between a target material and a non-target material can be obtained. At least one of 532 nm, 633 nm, and 780 nm may be used. While the present exemplary embodiment illustrates an example where a semiconductor laser is used as the light source 25 for the irradiation unit 22, the present exemplary embodiment is not limited to this example. Other laser light sources, such as a semiconductor excitation solid laser and a gas laser, can also be used.

(Light-Capturing Members)

The light-capturing members 20-$k$ are disposed above the conveyance surface 200S to capture the secondary light from the upper surface of each specimen 900$i$ conveyed by the conveyance unit 200. In other words, the light-capturing members 20-$k$ are disposed above the respective conveyance tracks TR$k$ corresponding to an irradiation area for the converging rays 220-$k$ from the irradiation units 22-$k$ so that the secondary light from the upper surface of each specimen 900$i$ passing the irradiation area can be captured.

The light-capturing member 20 includes the objective lens 260, the dichroic mirror 250, an imaging lens 270, and the optical fiber 190. Like in the irradiation unit 22, examples of the objective lens 260 in the light-capturing member 20 include a convex lens, a collimator lens, a concave lens, and a zoom lens. To reduce unwanted light in spectral measurement, the light-capturing member 20 may include a wavelength filter, such as a band-pass filter or a long-path filter, to reduce excitation light components included in the primary light (the converging ray).

The light-capturing member 20 includes the objective lens 260 with a large numerical aperture to secure the light capturing efficiency. A numerical aperture ranging from 0.25 to 0.5 is adopted as the numerical aperture of the objective lens 260 in the light-capturing member 20. Specifically, B-270 that is manufactured by SCHOTT Corporation and has an effective lens diameter of $\varphi$25 mm, a focal length of 20 mm, and a numerical aperture of 0.5 can be used as the objective lens 260.

(Spectral Image Acquisition Unit)

As illustrated in FIG. 2, the spectral image acquisition unit 10 includes an imaging lens 110, a long-path filter 120, a spectral element 150, and an image capturing device 170, which are disposed in this order from the side of the light-capturing member 20. The spectral element 150 and the image capturing device 170 are disposed to disperse light captured by the light-capturing member 20 via an imaging lens 160, and to project a continuous spectrum in a row direction or a column direction of a light-receiving element array of the image capturing device 170. As the image capturing device 170, a charge-coupled device (CCD) sensor, a complementary metal oxide semiconductor (CMOS) sensor, or the like in which light-receiving elements are arranged one-dimensionally or two-dimensionally is adopted. The spectral element 150 can also be referred to as a diffraction grating.

The imaging lens 110 shapes the light transmitted from the light-capturing member 20 via the optical fiber 190 into parallel light. The long-path filter 120 captures the light and reduces excitation light components included in the captured light, and allows Raman scattered light to pass. The spectral element 150 captures the light, disperses the captured light and causes wavelength components to be dispersed in a fan-like fashion. The imaging lens 160 projects the light dispersed by the spectral element 150 on the image capturing device 170. A Rowland arrangement or Czerny-Turner system is adopted for the spectral element 150.

The image capturing device 170 acquires spectroscopic information Si in association with each specimen 900$i$ in consideration of a captured spectral image, a photoelectric conversion characteristic of an image sensor included in the image capturing device 170, a transmission characteristic of an optical system, and the like. In the present exemplary embodiment, a spectral element (e.g., a diffraction grating) and an image sensor are used for the spectral element 150. Alternatively, Fourier transform processing may be executed after an interference figure is acquired by a photodetector, to calculate a spectrum. More alternatively, a plurality of different band-pass filters may be provided to detect the intensity of each transmitted light beam, to acquire spectroscopic information. A mode in which the spectral element 150 detects the intensity of each transmitted light beam while changing the wavelength of the light source 25 to acquire a spectrum is also included in a modified example of the present exemplary embodiment. In addition, the spectral element 150 may acquire polarization information, including circular dichroism or optical rotatory dispersion, in addition to a spectrum.

(Material Information Reference Unit)

The spectroscopic information acquisition unit 100 includes a material information reference unit 180 that acquires material information in association with each specimen 900$i$, based on the spectroscopic information Si acquired by the spectral image acquisition unit 10. The material information reference unit 180 refers to a material database (not illustrated) on which reference data on Raman scattered light is recorded, and acquires material information Mi based on which a material contained in each specimen 900$i$ is identified by a similarity between the spectroscopic information Si and the reference data. The spectroscopic information acquisition unit 100 stores at least one of the spectroscopic information Si and the material information Mi in a first storage unit 60 via an instruction unit 40 to be described below.

The material database to be referenced by the material information reference unit 180 may be stored in a local server included in the identification apparatus 1000, or may be stored in a remote server that is accessible via the Internet or an intranet.

As described above, the spectroscopic information acquisition unit 100 can acquire the material information Mi indicating a material, a mixture of an additive or an impurity component, and the like, which are contained in each specimen 900$i$.

(Form Information Acquisition Unit)

As illustrated in FIGS. 1A and 1B, a form information acquisition unit 70 includes a camera 76 and an image processing unit 78. The camera 76 is disposed such that an image capturing field of view 700 overlaps the conveyance unit 200. The image processing unit 78 processes an image of each specimen 900$i$ captured by the camera 76. The form information acquisition unit 70 acquires form information Fi in association with each specimen 900$i$. Like the material information Mi, the form information Fi is information in association with a property of each specimen 900$i$.

The image processing unit 78 performs image processing, including contrast and contour extraction, and acquires a length in the conveyance direction dc, a reflection color, a shape, and a mixing degree of materials, and the like of each specimen 900$i$. The image processing unit 78 can also be referred to as an element configured to perform processing for acquiring information in association with the size of each specimen 900$i$. The form information acquisition unit 70 can include a photointerrupter or a laser interferometer in place of the camera 76. The form information acquisition unit 70 can also be referred to as an image capturing portion.

(Acquisition Unit)

The acquisition unit 30 acquires identification information Di indicating whether each specimen 900$i$ is a target specimen or a non-target specimen based on the material information Mi or the spectroscopic information Si acquired by the spectroscopic information acquisition unit 100 and the form information Fi acquired by the form information acquisition unit 70. The acquisition unit 30 outputs the acquired identification information Di to the instruction unit 40. While, the non-target specimen is identified as a specimen with a low content of target material, the acquisition unit 30 can provide an additional identification information Di based on the content of a second target material.

In other words, the acquisition unit 30 identifies a property of each specimen 900$i$ based on the Raman spectrum included in the secondary light captured by the light-capturing member 20. In other words, the acquisition unit 30 according to the present exemplary embodiment identifies a property of each specimen 900$i$ based on an image of the specimen 900$i$ acquired by the camera 76 and the Raman spectrum included in the secondary light captured by the light-capturing member 20.

The spectroscopic information acquisition unit 100 and the form information acquisition unit 70 according to the present exemplary embodiment can be replaced by a hyperspectral camera or a multiband camera with which form information and spectroscopic information can be acquired from a captured image. In other words, an identification apparatus (not illustrated) according to this modified example includes a detection system that can read out material information and form information and acquire multi-dimensional data.

(Control Unit)

The identification apparatus 1000 includes a control unit 400 including the instruction unit 40 that controls a sorting operation to be performed by the sorting device 300 based on the property of each specimen 900$i$, a second storage unit 80 that stores conditions for controlling the sorting operation, and the first storage unit 60 that stores the property of each specimen 900$i$. The control unit 400 also includes a display unit 140 that provides a graphical user interface (GUI) which is used by a user to designate control conditions. The display unit 140 may display information acquired by the acquisition unit 30.

(Storage Units)

The first storage unit 60 is configured to store, for each specimen 900$i$, the identification information Di, the material information Mi, the spectroscopic information Si, and the form information Fi in association with a timing tp of when each specimen 900$i$ passes the irradiation area for the converging rays 220-$k$.

The second storage unit 80 is configured to store, for each specimen 900$i$, control conditions that correspond to the identification information Di and are used to control an intensity Is of the sorting operation to be performed by the sorting device 300. The control conditions include formats, such as a table that can be referenced, an algebraically expressed general formula, and statistical information obtained by machine learning. (Instruction Unit)

The instruction unit 40 estimates a passage time tp of specimen 900$i$ passing through a processing area where sorting processing is performed by the sorting device 300, in accordance with the identification information Di acquired from the acquisition unit 30 and the material and size of each specimen 900$i$, and generates a command for controlling the sorting operation to be performed by the sorting device 300. The passage time tp of each specimen 900$i$ passing through the processing area can be estimated based on at least one of a signal from the form information acquisition unit 70, a signal from the spectroscopic information acquisition unit 100, and a signal from a specimen sensor (not illustrated) provided in the conveyance unit 200.

(Sorting Device)

As illustrated in FIGS. 1A to 1D and FIG. 5A, the sorting device 300 includes air nozzles 330 for discharging compressed air in a predetermined discharge period at a predetermined discharge rate and a predetermined discharge flowrate, and a sorting control unit 350 that controls a solenoid valve (not illustrated) included in each air nozzle 330. The sorting control unit 350 receives a control signal from the instruction unit 40 in the identification apparatus 1000. The sorting operation by the sorting device 300 according to the present exemplary embodiment includes a fluid discharge operation. Examples of fluid to be discharged in the fluid discharge operation include air, dry nitrogen, inert gas, such as rare gas, liquid, and gas-liquid mixture fluid (aerosol). The sorting device 300 collects the specimens 900$i$ into one of a target collection basket 620, a non-target collection basket A 600, and a non-target collection basket B 640, based on the property of each specimen 900$i$ in accordance with the control signal received from the instruction unit 40.

In the sorting device 300, a discharge device that discharges fluid can be replaced by a flap gate that opens and closes at a predetermined angular speed, a shutter that opens and closes at a predetermined speed, or the like. The form information acquisition unit 70, the spectroscopic information acquisition unit 100, and the sorting device 300, which are included in the identification apparatus 1000, and the components of these units are arranged in parallel at different positions in the conveyance width direction dw of the conveyance unit 200, whereby the integration level of the system can be improved and the processing speed can be increased.

(Conveyance Unit)

The conveyance unit 200 is a conveyance unit that conveys the plurality of specimens 900$i$ (i=1, 2, . . . ) sequentially supplied from the feeder 500 in the conveyance direction dc (x-direction in FIGS. 1A to 1D) at the predetermined conveyance speed vc. The conveyance unit 200 and the feeder 500 are included in the conveyance unit that conveys each specimen 900$i$.

The conveyance unit 200 according to the present exemplary embodiment includes a conveyance belt that conveys each specimen 900$i$ supplied from the feeder 500 at the predetermined conveyance speed vc in the conveyance direction dc. The conveyance unit 200 linearly conveys each specimen 900$i$ on the conveyance surface 200S. In a modified example, the conveyance unit 200 can be replaced by a revolving table type feeder that conveys the specimens 900$i$ outward in a spiral manner, a vibration feeder provided with a vibrator for moving each specimen 900$i$ in a predetermined direction, a conveyor roller formed of a plurality of rollers, or the like.

Since the conveyance unit 200 causes each specimen 900$i$ to move such that the specimen 900$i$ passes through the image capturing field of view 700 of the camera 76, the conveyance unit 200 can also be referred to as the placement unit 200 for the form information acquisition unit 70.

According to the present exemplary embodiment, in the case of using a conveyor belt, 0.1 to 5 m/s can be applied as the conveyance speed vc of the conveyance unit 200.

A mode in which classification processing for filtering the shape or size of each specimen 900$i$ is performed as preprocessing for the supply process by the feeder 500 is also included in a modified example of the identification method using the identification apparatus 1000 according to the present exemplary embodiment. As a unit for performing preprocessing, a vibration conveyor, a vibration sieve, a crusher/grain-grader, and the like may be used.

(Correspondence between Placement Unit and Irradiation Unit)

Next, the arrangement relationship between the placement unit 50 and the irradiation unit 22 according to the present exemplary embodiment will be described.

A first characteristic value for the placement unit 50 according to the present exemplary embodiment is the height hi of each specimen 900$i$ from the conveyance surface 200S when the specimen 900$i$ is placed on the conveyance surface 200S. In the placement unit 50 according to the present exemplary embodiment, each specimen 900$i$ is not placed by an operation for placing the specimen 900$i$ at a predetermined position in the conveyance width direction dw based on a measurement value of the height hi of the specimen 900$i$. The placement unit 50 according to the present exemplary embodiment is installed in the identification apparatus 1000 such that the position of the identification apparatus 1000 relative to the conveyance unit 200 is not changed, and includes a plurality of gap gates 50-1 to 50-4 with different gaps from the conveyance surface 200S. The placement unit 50 including the gap gates 50-1 to 50-4 places each specimen 900$i$ at a predetermined position in the conveyance width direction dw. In other words, the placement unit 50 is a static placement unit on which each specimen 900$i$ is placed at a predetermined position in the conveyance width direction dw, based on a geometric arrangement relationship with the conveyance unit 200.

As illustrated in FIGS. 1B and 1C, the placement unit 50 according to the present exemplary embodiment is a static gap gate with a varying height at which each specimen 900$i$ can pass in the conveyance width direction dw. The placement unit 50 serving as the static gap gate is disposed obliquely to each of the conveyance direction dc and the conveyance width direction dw of the conveyance unit 200 so that the height at which each specimen 900$i$ can pass not only in the conveyance width direction dw, but also in the conveyance direction dc is varied.

The placement unit 50 includes the plurality of gap gates 50-1 to 50-4 in which the area of the corresponding gap from the conveyance surface 200S of the conveyance unit 200 is gradually increased from the upstream side to the downstream side in the conveyance direction dc. On the other hand, the placement unit 50 includes the plurality of gap gates 50-1 to 50-4 in which the area of the corresponding gap from the conveyance surface 200S of the conveyance unit 200 is gradually increased from the conveyance track TR1 that is closest to the feeder 500 toward the conveyance track TR4 in the conveyance width direction dw.

As illustrated in FIGS. 1C and 1D, the difference between the gaps of the gap gates 50-1 to 50-4 is set to match a difference AWD between working distances WD of the irradiation units 22-1 to 22-4. Specifically, the gap in the height direction of each of the gap gates 50-1 to 50-4 which correspond to the conveyance tracks TR1 to TR4, respectively, and through which the specimen 900$i$ can pass matches the height of each of focal planes 65-1 to 65-4. As illustrated in FIG. 8B, the height of each of the conveyance tracks TRk corresponding to the gap gates 50-1 to 50-4, respectively, matches the height of each of the focal planes 65-$k$ (k: 1 to 4) of the respective conveyance tracks TRk.

The placement unit 50 according to the present exemplary embodiment sorts the plurality of specimens 900$i$ that are supplied from the feeder 500 and conveyed along the conveyance track TR1 into four height levels corresponding to the static gap gates 50-1 to 50-4, respectively, and places the specimens 900$i$ on any one of the conveyance tracks TR1 to TR4. Specifically, the placement unit 50 includes the static gap gates 50-1 to 50-4 each including a portion in which a condition of height (gap condition) from the conveyance surface 200S for allowing each specimen 900$i$ to pass is different. As illustrated in FIGS. 1A, 1C, and 1D, the height of each of the static gap gates 50-1 to 50-4 corresponds to the height of each of the focal planes 65-1 to 65-4 of the irradiation units 22-1 to 22-4 disposed on the conveyance tracks TR1 to TR4, respectively. The static gap gates 50-$k$ (k: 1 to 4) can also be referred to as the stationary gap gates 50-$k$ (k: 1 to 4).

The irradiation units 22-1 to 22-4 irradiate light condensed on the focal planes 65-1 to 65-4 to increase the intensity of detection light per unit irradiation area. The spectroscopic information acquisition unit 100 corresponding to a detection unit includes light-capturing members 20-1 to 20-4 that are disposed coaxially with the irradiation units 22-1 to 22-4, respectively, on the conveyance tracks TR1 to TR4. The light-capturing members 20-1 to 20-4 each include an objective lens for forming an image on a detection surface so that scattered light from the focal planes 65-1 to 65-4 of the irradiation units 22-1 to 22-4 can be effectively captured.

Accordingly, the height of the detection surface of each of the conveyance tracks TR1 to TR4 matches the height of each of the focal planes 65-1 to 65-4 of the irradiation units 22-1 to 22-4. Specifically, as illustrated in FIGS. 1C and 1D, the height of each of the gap gates 50-1 to 50-4 matches the height of each of the focal planes 65-1 to 65-4 on the respective conveyance tracks TR1 to TR4. In other words, as illustrated in FIGS. 1C and 1D, the height of each of the gap gates 50-1 to 50-4 matches the height of each of the detection surfaces 65-1 to 65-4 on the respective conveyance tracks TR1 to TR4.

Each specimen 900$i$ that is supplied from the feeder 500 via a supply area 550 and is started to be conveyed is placed on a predetermined one of the conveyance tracks TR1 to TR4 in accordance with the height hi of each specimen 900$i$ through the gaps of the gap gates 50-1 to 50-4, the area of which is gradually increased. The height hi of each specimen 900$i$ conveyed to the conveyance track TRk among the conveyance tracks TR1 to TR4 matches the height of each focal plane 65-$k$ of the corresponding irradiation member 22-$k$ included in the spectroscopic information acquisition unit 100. Accordingly, the image of the irradiation light 220-$k$ is formed on the upper surface of the specimen 900$i$ placed on the conveyance track TRk by the placement unit 50, and the light-capturing member 20-$k$ can capture scattered light from the specimen 900$i$ with a sufficient scattering light intensity. FIG. 1A corresponds to a case where the conveyance track number k is 1.

Thus, the arrangement of the placement unit 50 and the detection unit (spectroscopic information acquisition unit) makes it possible to reduce variations in the spot diameter of the irradiation light 220 on the irradiation surface of each specimen 900$i$ and to reduce variations in the intensity of Raman scattered light even when the specimens 900$i$ have different sizes. The working distance WD between the irradiation units 22-$k$ is determined in consideration of the light focusing operation of the irradiation units 22-$k$, variations in the spectral reflectance of each specimen 900$i$, and the like. The working distance WD in a range from 2 mm to 50 mm can be adopted.

Unlike the identification apparatus of the related art including the pressing unit, the identification apparatus 1000 includes no pressing force application mechanism that can cause each specimen 900$i$ to be deformed. Accordingly, the identification apparatus 1000 can capture secondary light from a predetermined focal plane with a high detection intensity without being adversely affected variations in the height of the detection surface due to deformation of each specimen 900i. Therefore, the identification apparatus 1000 according to the present exemplary embodiment is an identification apparatus in which a decrease in the number of inspection processes and deterioration in identification accuracy are less likely to occur even when the specimens 900i to be conveyed have different sizes or shapes.

(Modified Examples)

Next, modified examples 51 to 53 of the static placement unit 50 will be described with reference to FIGS. 3A to 3C, and an irradiation member 23 corresponding to the placement unit 53 will be described with reference to FIG. 3D.

The difference AWD between the working distances WD of gap gates 51-1 to 51-4 corresponding to the conveyance tracks TR1 to TR4, respectively, in a placement unit 51 illustrated in FIG. 3A is similar to that in the placement unit 50. Specifically, the gap in the height direction of each of the gap gates 51-1 to 51-4 which correspond to the conveyance tracks TR1 to TR4, respectively, and through which each specimen 900i pass matches the height of each of the focal plane 65-1 to 65-4. On the other hand, the placement unit 51 differs from the placement unit 50 in that the difference between the gaps of the corresponding gap gates 51-2 and 51-3 in the vicinity of a median of a height distribution of a group of specimens 900i is set to be smaller than the difference between the gaps of the gap gates 50-2 and 50-3 in the placement unit 50. In other words, the placement unit 51 differs from the placement unit 50 in that the gap of each of the gap gates 50-1 to 50-4 in the conveyance width direction dw of the placement unit 50 is changed linearly, while the gap of each of the gap gates 51-1 to 51-4 in the placement unit 51 is changed non-linearly.

According to the placement unit 51, when the sizes of the group of specimens 900i have values in a normal distribution, a distribution ratio for sorting high-frequency components of the specimen group can be set to be higher than that in the placement unit 50 without concentrating the high-frequency components only on the conveyance tracks TR2 and TR3.

Specifically, in the modified example of the identification apparatus 1000 including the placement unit 51, the number of conveyance processes per unit time for each of the conveyance tracks TR1 to TR4 can be leveled among the conveyance tracks TR1 to TR4, and the conveyance speed is less likely to be limited due to a specific conveyance track identification ability.

Like in the placement unit 50, in the placement unit 52 illustrated in FIG. 3B, the difference between gaps corresponding to the conveyance tracks TR1 to TR4 matches the difference AWD between the working distances WD of the irradiation units 22. Specifically, the gap in the height direction of each of gap gates 52-1 to 52-4 which correspond to the conveyance tracks TR1 to TR4, respectively, and through which each specimen 900i can pass matches the height of each of the focal planes 65-1 to 65-4. On the other hand, the placement unit 52 differs from the placement unit 50 in that the placement unit 52 includes a single blade with a gap that is linearly changed in the conveyance width direction dw.

In the placement unit 52, the gap is continuously changed in the conveyance width direction dw, and thus each specimen 900i is less likely to be caught on a step (discontinuous portion) of the gap. Accordingly, it is expected that the operating rate of the conveyance operation to be performed by the conveyance unit 200 can be increased. When an angle θ formed between a single blade of the placement unit 52 and the conveyance surface 200S along the conveyance width direction dw is represented by 90°±α (where 0<α<90°), 15°<α<80° is selected. The value a is appropriately set based on a track interval between the conveyance tracks TR-k, the conveyance speed vc, statistical information, including the geometric characteristic and mechanical characteristic of the group of specimens 900i (i=1, 2, . . . ), and the like. The geometric information in association with each specimen 900i includes a diameter and a sectional area, and the mechanical characteristic of each specimen 900i includes at least one of a modulus of elasticity, a rigidity ratio, and a fracture toughness. The statistical information in association with each specimen 900i includes an average value, a median, a standard deviation, and a covariance.

Like in the placement units 50 to 52, in a placement unit 53 illustrated in FIG. 3C, the difference between the gaps corresponding to the conveyance tracks TR1 to TR4 matches the difference AWD between the working distances WD of the irradiation units 22. Specifically, the gap in the height direction of each of gap gates 53-1 to 53-4 which correspond to the conveyance tracks TR1 to TR4, respectively, and through which each specimen 900i can pass matches the height of each of the focal planes 65-1 to 65-4. On the other hand, the placement unit 53 differs from the placement unit 50 in that the placement unit 53 includes gap gates 53-1 to 53-4 corresponding to the conveyance tracks TR1 to TR4 disposed at irregular track intervals.

The placement unit 53 and the irradiation unit 23 illustrated in FIGS. 3C and 3D, respectively, are disposed corresponding to the conveyance tracks TR1 to TR4 including a non-linear track interval in which the interval between the conveyance tracks TR2 and TR3 is narrower than the interval between the conveyance tracks TR1 and TR2 and the interval between the conveyance tracks TR3 and TR4.

A placement unit 53 and the conveyance tracks TR2 to TR4 according to the present modified example are configured such that the widths in the conveyance width direction dw of the gap gates 53-2 to 53-4 are sequentially increased along with an increase in the area of the gap in the direction from the gap gate 53-2 to the gap gate 53-4. As a result, the placement unit 53 and the conveyance tracks TR1 to TR4 according to the present modified example are configured in consideration of a distribution of shapes of the group of specimens 900i with a positive correlation between the width and the height of each specimen 900i, and the conveyance tracks can be disposed at a high density in the conveyance width direction dw.

Next, other modified examples, placement units 54 to 58, of the static placement unit 50 will be described with reference to FIGS. 4A to 4E.

The placement unit 54 illustrated in FIG. 4A is similar to the placement unit 52 in that the area of each of gaps is continuously increased across the conveyance tracks TR1 to TR4. The placement unit 54 differs from the placement unit 52 in that the placement unit 54 includes an annular rubber belt 54b that is rotatably provided near a stationary gap blade 54a.

According to the placement unit 54, when each specimen 900i conveyed in the direction from the upstream side to the downstream side of the conveyance unit 200 comes into contacts with the placement unit 54, the specimen 900i can be more smoothly moved in the conveyance width direction dw than in the placement unit 52 by the rotation of the annular rubber belt 54b. In FIGS. 3A to 3D and FIGS. 4A to 4E, the conveyance direction dc coincides with a direction from a back side to a front side of a drawing sheet. The placement units 55 to 58 illustrated in FIGS. 4B to 4E, respectively, are modified examples of the placement unit 54 in which the movement of each specimen 900i is accelerated in the conveyance width direction dw.

As illustrated in FIG. 4B, the placement unit 55 differs from the placement unit 54 in that the placement unit 55 includes a base 55a provided across the conveyance tracks TR1 to TR4 with a gap tilted with respect to the conveyance surface 200S, and a nine-wheel disc 55b disposed in the longitudinal direction of the base 55a.

As illustrated in FIG. 4C, the placement unit 56 differs from the placement unit 54 in that the placement unit 56 includes a support shaft 56a that is tilted with respect to the conveyance surface 200S toward the conveyance tracks TR1 to TR4, and a rubber roller 56b that is rotatably supported in association with the support shaft 56a. The rubber roller 56b can be replaced by another elastic body having flexibility, such as a sponge.

As illustrated in FIG. 4D, the placement unit 57 is a modified example of the placement unit 56. The placement unit 57 differs from the placement unit 56 in that the placement unit 57 includes a support shaft 57a disposed in parallel to the conveyance surface 200S, and rubber rollers 57b to 57e that are rotatably supported by the support shaft 57a and have different radii to form different gaps for the respective conveyance tracks TR1 to TR4.

As illustrated in FIG. 4E, the placement unit 58 is a modified example of the placement unit 56. The placement unit 58 differs from the placement unit 56 in that the placement unit 58 includes a support shaft 58a disposed with a tilt with respect to the conveyance surface 200S, and a brush roller 58b that is rotatably supported by the support shaft 589a and is disposed such that the area of the gap is gradually increased on the respective conveyance tracks TR1 to TR4. An elastic brush made of a resin, metal, or the like is adopted as the brush roller 58b. With the placement unit 58 including the brush roller 58b, it is expected that the heights of the specimens 900i can be sorted without being adversely affected by an attachment, a protrusion, or the like locally projecting from the surface of each specimen 900i.

Figure 5A:
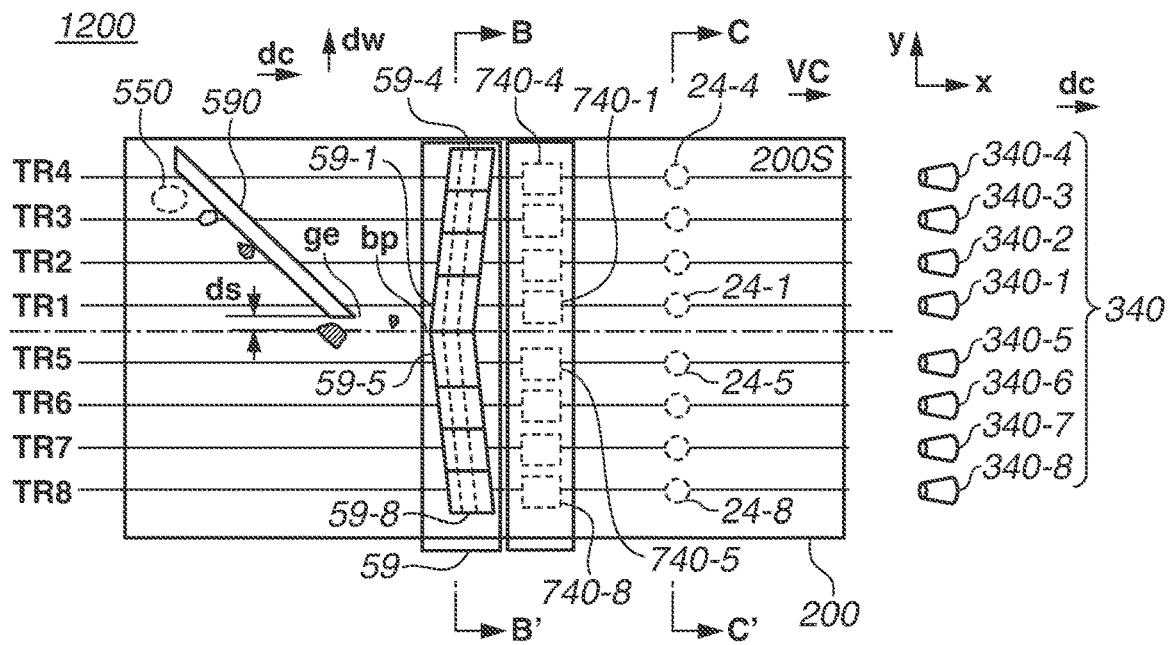
FIGS. 5A to 5C are diagrams each illustrating a schematic configuration of an identification apparatus according to a second exemplary embodiment.
Figure 5B:
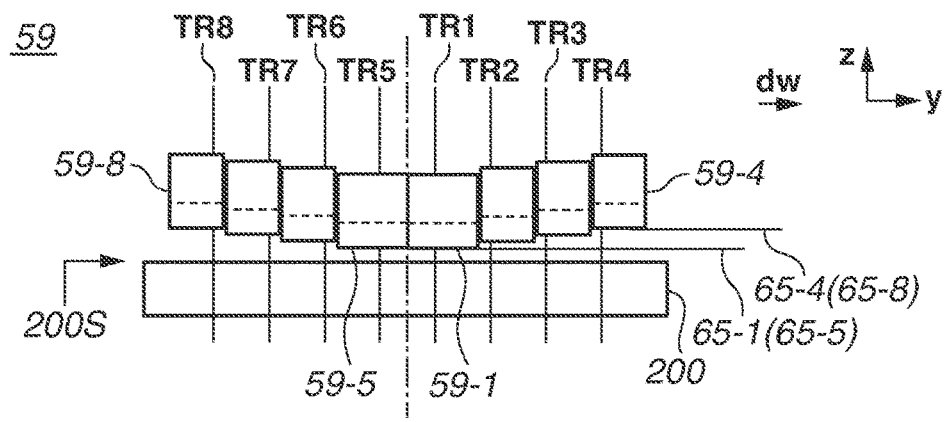
Figure 5C:
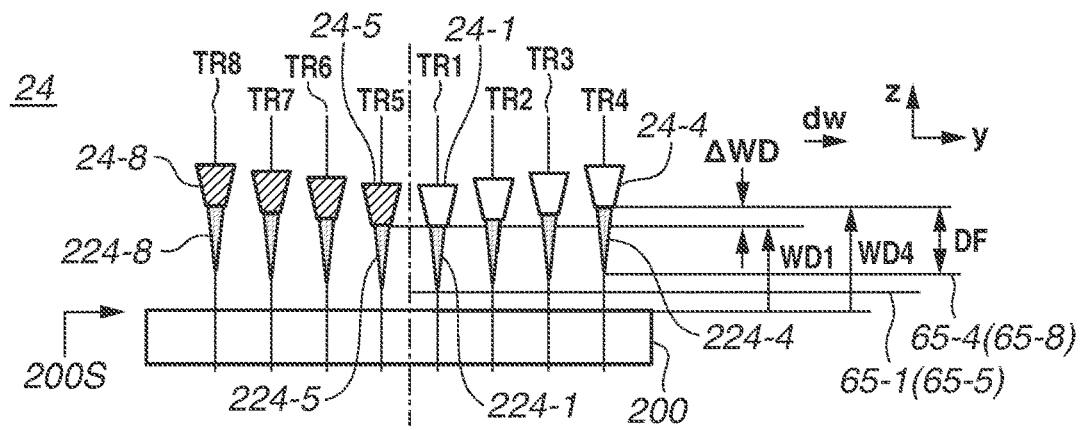

An identification apparatus 1200 according to a second exemplary embodiment will be described with reference to FIGS. 5A to 5C. FIGS. 5A to 5C each schematically illustrate a configuration example of the identification apparatus 1200 according to the second exemplary embodiment.

(Identification Apparatus)

The identification apparatus 1200 differs from the identification apparatus 1000 in that not only a specimen height (z-direction), but also a specimen width in the conveyance width direction dw (y-direction) are set as size conditions based on which the specimens 900i are sorted by a placement unit 59.

The identification apparatus 1200 includes the placement unit 59 for sorting the specimens 900i into conveyance tracks TR1 to TR8 in accordance with the specimen height, and an oblique guide 590 for sorting the specimens 900i into the conveyance tracks TR1 to TR4 and the conveyance tracks TR5 to TR8 in accordance with the specimen width.

The placement unit 59 includes gap gates 59-1 to 59-8 that are arranged along a chevron shape (V-shape) including an inflection point bp between the adjacent conveyance tracks TR1 and TR5 at a central portion in the conveyance width direction dw. The inflection point bp matches a boundary between the adjacent gap gates 59-1 and 59-5.

As illustrated in FIG. 5B, the gap gates 59-1 to 59-4 are installed in this order such that the area of each gap formed between each gap gate and the conveyance surface 200S is linearly increased in the outward direction from the center in the conveyance width direction dw of the conveyance unit 200. Similarly, as illustrated in FIG. 5B, the gap gates 59-5 to 59-8 are installed in this order such that the area of each gap formed between each gap gate and the conveyance surface 200S is linearly increased in the outward direction from the center in the conveyance width direction dw of the conveyance unit 200.

The gap gates 59-1 to 59-4 each include a gap with respect to the conveyance surface 200S, to correspond to the difference AWD between the working distances WD of irradiation members 24-1 to 24-4 illustrated in FIG. 5C. Similarly, the gap gates 59-5 to 59-8 each include a gap with respect to the conveyance surface 200S, to correspond to the working distance difference AWD between irradiation members 24-5 to 24-8 illustrated in FIG. 5C. In other words, the gap in the height direction of each of the gap gates 59-1 to 59-8 which correspond to the conveyance tracks TR1 to TR8, respectively, and through which each specimen 900i can pass matches the height of each of the focal planes 65-1 to 65-8.

The oblique guide 590 is a guide member provided obliquely to each of the conveyance width direction dw and the conveyance direction dc so that each specimen 900i can be guided from the supply area 550 between the conveyance tracks TR3 and TR4 to a location in the vicinity of the middle portion between the conveyance tracks TR1 and TR5. The oblique guide 590 is installed such that each specimen 900i can slidably move from the upstream side to the downstream side in the conveyance direction dc and in the direction from the conveyance track TR4 to the conveyance track TR1. A guide end ge of the oblique guide 590 that is at the downstream side in the conveyance width direction dw is disposed at a location that is apart from the inflection point bp of the placement unit 59 having the chevron shape by an offset width ds which is a predetermined width.

Each specimen 900i having a width that is twice as large as the offset width ds is sorted into the conveyance track TR5 that is far from the guide end ge relative to the inflection point bp of the placement unit 59. On the other hand, each specimen 900i having a width less than the twice of the offset width ds is sorted into the conveyance track TR1 that is near the oblique guide 590 relative to the inflection point bp of the placement unit 59. Conditions for sorting the specimen widths of the specimens 900i in the conveyance width direction dw can be adjusted by changing the offset width ds of the inflection point bp of each of the guide end ge of the oblique guide 590 and the placement unit 59 having the chevron shape.

The irradiation units 24-5 to 24-8 illustrated in FIG. 5C further increase the illuminance on the focal plane of irradiation light than in the irradiation units 24-1 to 24-4, to correspond to the difference in a specimen width wi sorted by the oblique guide 590. In other words, the irradiation units 24-5 to 24-8 have the enhanced focus diameter and the enhanced irradiation intensity of converging rays 224-5 to 224-8. Each specimen 900i having a larger projection area as viewed along the conveyance direction dc is irradiated with irradiation light with a higher intensity than that of the specimen 900i having a smaller projection area. In this case, a projection area Spi of each specimen 900i as viewed along the conveyance direction dc can also be referred to as a projection area viewed along the conveyance direction dc. The projection area Spi of each specimen 900i as viewed from the downstream side of the conveyance direction dc matches the product of the height hi of the specimen 900i and the width wi of the specimen 900i.

The identification apparatus 1200 according to the present exemplary embodiment includes the placement unit 59 having the chevron shape on which the specimens 900i are placed at different positions in the conveyance width direction dw, to correspond to a height of a focal plane 65 of an irradiation member 24 depending on the height hi of the specimen 900i. The identification apparatus 1200 also includes the oblique guide 590 by which the specimens 900i are placed at different positions in the conveyance width direction dw, to correspond to the light irradiation intensity of the irradiation unit 24 in accordance with the width wi of each specimen 900i.

Accordingly, like the identification apparatus 1000 according to the first exemplary embodiment, the identification apparatus 1200 according to the present exemplary embodiment is an identification apparatus in which a decrease in the throughput numbers of inspection processes and deterioration in identification accuracy are less likely to occur even in a case where the specimens 900i to be conveyed have different sizes or shapes. Unlike the identification apparatus of the related art including the pressing unit, the identification apparatus 1200 includes no pressing force application mechanism that can cause each specimen 900i to be deformed. Accordingly, the identification apparatus 1200 can capture secondary light from a predetermined focal plane with a high detection intensity without being adversely affected by variations in the height of the detection surface due to deformation of each specimen 900i.

An identification apparatus 1400 according to a third exemplary embodiment will be described with reference to FIGS. 6A to 6D and FIGS. 7A to 7E. FIGS. 6A to 6D each schematically illustrate a configuration example of the identification apparatus 1400 according to the third exemplary embodiment. FIGS. 7A to 7E each schematically illustrate an operation of a placement unit according to the present exemplary embodiment.

(Identification Apparatus)

The identification apparatus 1400 differs from the identification apparatuses 1000 and 1200 in that the identification apparatus 1400 includes a placement unit 50AG including a plurality of movable gates for selectively performing an opening and closing operation so that the specimens 900i can be sorted into any one of the conveyance tracks TR1 to TR4 based on a detected specimen size.

Further, the identification apparatus 1400 differs from the identification apparatuses 1000 and 1200 in that a form information acquisition unit 90 for detecting the size of each specimen 900i is disposed corresponding only to the conveyance track TR1 at the upstream side in the conveyance direction dc of the placement unit 50AG. The form information acquisition unit 90 includes a stereo camera 92 disposed such that the image capturing field of view overlaps the conveyance track TR1, and an image processing unit 94 that performs image processing on a specimen image captured by the stereo camera 92. The form information acquisition unit 90 acquires the form information Fi including the height hi of each specimen 900i.

The identification apparatus 1400 differs from the identification apparatus 1000 in that the instruction unit 40 instructs the placement unit 50AG to control the opened or closed state of each of movable gates 50AG-k (k: 1 to 4) based on information in association with the height hi of the specimen 900i acquired by the form information acquisition unit 90.

Next, an identification operation of the identification apparatus 1400 in accordance with a conveyance flow of the group of specimens 900i will be described with reference to FIGS. 6A, 6B, and 6C.

Like in the first exemplary embodiment, the feeder 500 sequentially supplies the group of plurality of accommodated specimens 900i to the supply area 550 on the conveyance track TR1 of the conveyance unit 200 at predetermined time intervals. Each specimen 900i supplied onto the conveyance surface 200S of the conveyor belt by the feeder 500 is conveyed in the conveyance direction dc along the conveyance track TR1, and passes through an image capturing field of view 920 of the stereo camera 92.

The form information acquisition unit 90 acquires the form information Fi including the height hi of the specimen 900i based on the image captured by the stereo camera 92, and outputs the acquired form information Fi to the instruction unit 40.

The instruction unit 40 estimates a time tr of when each specimen 900i reaches the movable gate 50AG-1, based on the length Li of the specimen 900i included in the form information Fi and the conveyance speed vc. Next, the instruction unit 40 outputs a command signal to the placement unit 50AG so that the movable gates 50AG-k (k: 1 to 4) are brought into any one of the opened and closed states illustrated in FIGS. 7A to 7E at the estimated arrival time tr based on the height hi of the specimen 900i included in the form information Fi. The instruction unit 40 can also be referred to as a gate control unit that controls the opened or closed state of each of the movable gates 50AG-k (k: 1 to 4) in the placement unit 50AG. As a result, each specimen 900i is placed on any one of the conveyance tracks TR1 to TR4 where the height hi substantially matches the height of each of the focal planes 65-1 to 65-4 of the irradiation units 22-1 to 22-4. The height (gap) with respect to the conveyance surface 200S at a lower end of each movable gate when the movable gates 50AG-k (k: 1 to 4) are opened corresponds to the height of each of the focal planes 65-1 to 65-4.

Figure 6A:
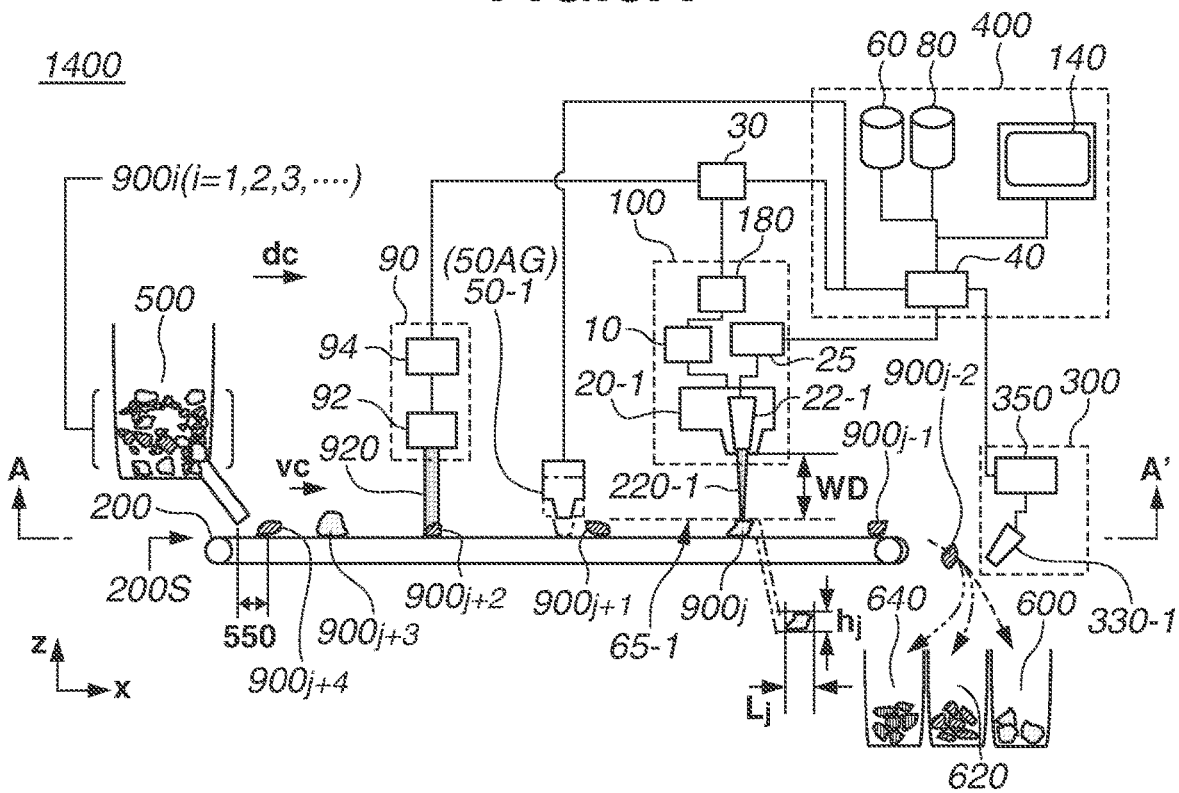
Figure 6B:
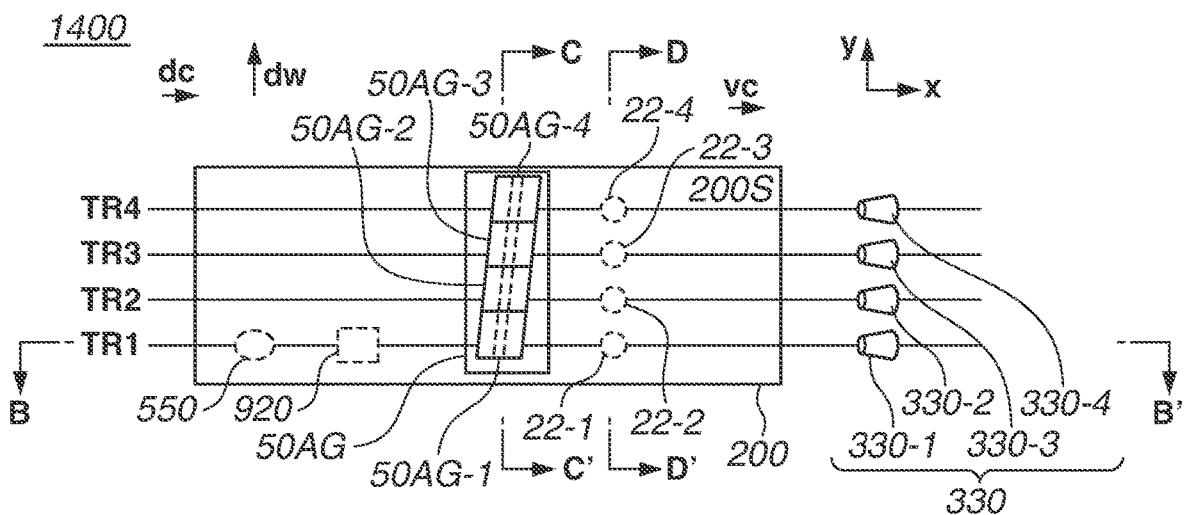

In FIG. 6A, the height hi of each specimen 900i is represented by a height $h_j$, and reference symbol "j" denotes the order in which the specimen 900i is conveyed on the conveyance track TRk of interest. Similarly, in FIG. 6A, the length Li of the specimen 900i is represented by a length $L_j$, and reference symbol "j" denotes the order in which the specimen 900i is conveyed.

Figure 7A:
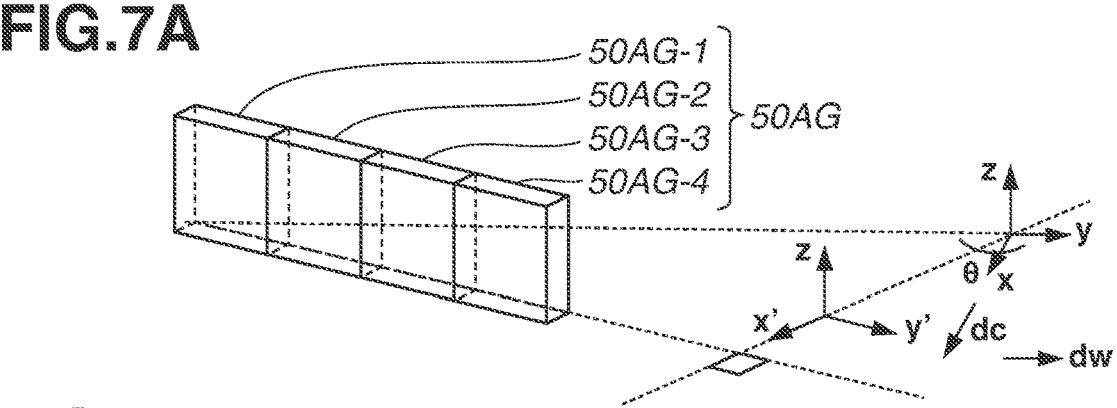
FIGS. 7A to 7E are diagrams illustrating an opening and closing operation of a selection gate included in a placement unit according to the third exemplary embodiment.
Figure 7B:
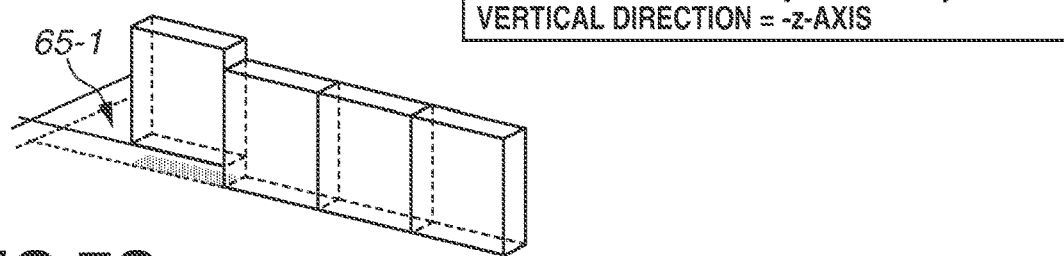
Figure 7C:
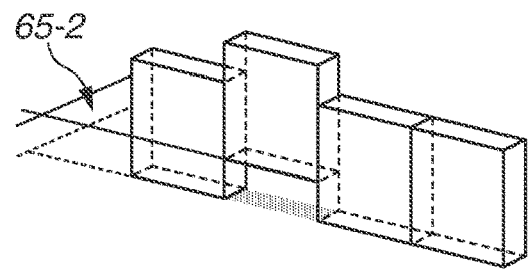
Figure 7D:
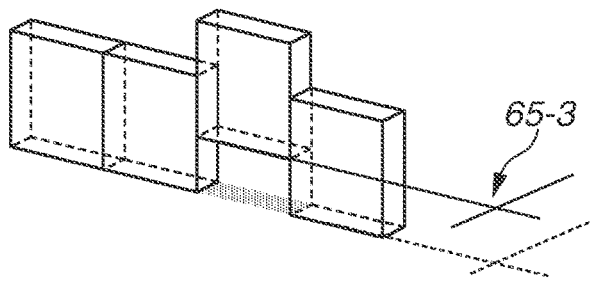
Figure 7E:
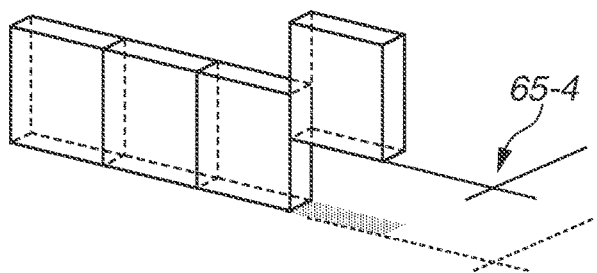

Specimen groups $900_{j-2}$ to $900_{j+1}$ illustrated in FIG. 6A represent specimen groups that pass through the movable gate 50AG-1 illustrated in FIG. 7B at different times and are conveyed on the conveyance track TR1. In the example illustrated in FIG. 6A, each specimen $900_j$ that has passed through the movable gate 50AG-1 is irradiated with converging rays (primary light) from the irradiation unit 22-1 in an in-focus state, and scattered light (secondary light) is captured by the light-capturing member 20-1.

In the present exemplary embodiment, the in-focus state corresponds to a state where the height of the focal plane 65-k of the converging ray 220-k on the irradiation unit 22-k substantially matches the height of the irradiated surface of the specimen 900i. In the present exemplary embodiment, the in-focus state corresponds to a state where the depth of focus ΔDF of the converging ray 220-k on the irradiation unit 22-k overlaps the height of the irradiated surface of the specimen 900i in the optical axis direction of the converging rays 220-k.

Like in the first exemplary embodiment, the spectral image acquisition unit 10 included in the spectroscopic information acquisition unit 100 acquires the spectroscopic information Si in association with each specimen 900$i$, based on the light acquired by the light-capturing member 20-1. Next, the material information reference unit 180 included in the spectroscopic information acquisition unit 100 acquires the material information Mi in association with each specimen 900$i$, based on the acquired spectroscopic information Si. The material information reference unit 180 refers to a material database (not illustrated) on which reference data in association with Raman scattered light is recorded, and acquires the material information Mi in which a material contained in the specimen 900$i$ is identified, based on a similarity between the spectroscopic information Si and the reference data. The spectroscopic information acquisition unit 100 stores at least one of the spectroscopic information Si and the material information Mi in the first storage unit 60 via the instruction unit 40.

As described above, like in the first exemplary embodiment, the spectroscopic information acquisition unit 100 acquires the material information Mi indicating a material contained in each specimen 900$i$, a mixture of an additive or an impurity component, and the like.

Next, like in the first exemplary embodiment, the instruction unit 40 included in the control unit 400 outputs a command signal for instructing the sorting operation of an air nozzle 330-1 to the sorting device 300 based on the form information Fi, the material information Mi, and the estimated passage time tp. As a result, based on the identification result acquired by the acquisition unit 30, the specimens 900$i$ are sorted into any one of the predetermined collection baskets 600, 620, and 640 by the air nozzle 330-1.

Accordingly, like the identification apparatuses 1000 and 1200 according to the first and second exemplary embodiment, respectively, the identification apparatus 1400 according to the present exemplary embodiment is an identification apparatus in which a decrease in the throughput numbers of inspection processes and deterioration in identification accuracy are less likely to occur even in a case where the specimens 900$i$ to be conveyed have different sizes or shapes. Unlike the identification apparatus of the related art including the pressing unit, the identification apparatus 1400 includes no pressing force application mechanism that can cause each specimen 900$i$ to be deformed, and can set the height of the light irradiation surface (detection surface) corresponding to the height hi of each specimen 900$i$ to match the height of the focal plane 65 of the irradiation unit 22. Therefore, the identification apparatus 1400 can capture secondary light from a predetermined focal plane with a high detection intensity without being adversely affected by variations in the height of the detection surface due to deformation of each specimen 900$i$.

The movable gates 50AG-$k$ (k: 1 to 4) can be replaced by other movable gates, such as a flap type gate including a shutter that is rotated in association with a predetermined rotation axis, or a folding type gate that can be rolled up like a roller screen.

Light fluxes of the converging rays 220 and 224 irradiated from the irradiation units 22 and 24, respectively, are illustrated using an isosceles triangle based on a conical model, for ease of explanation, to indicate the position of the focal plane 65 in FIGS. 1A, 2, 3D, 5C, and 6D. On the other hand, light fluxes of the converging rays 220 and 224 irradiated from the irradiation units 22 and 24, respectively, have a shape of one-sheet hyperboloid of rotation in implementation, and form the focal spot with the predetermined focus diameter φ and the depth of focus ΔDF on the focal plane 65.

Figure 8A:
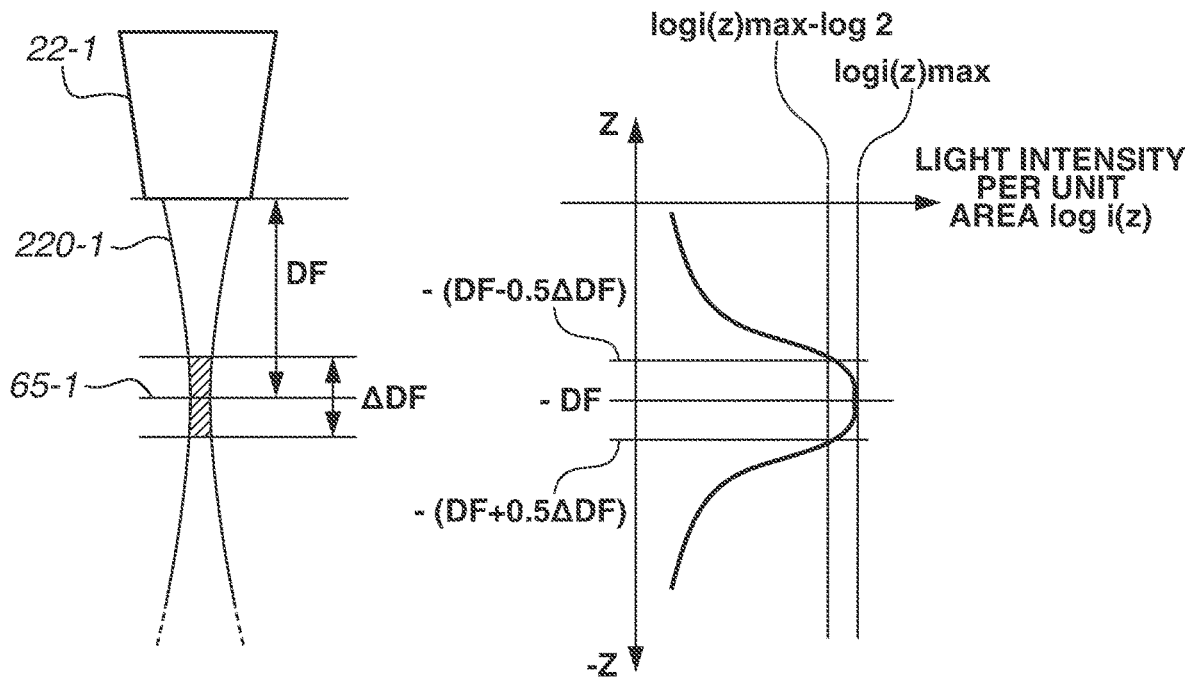
FIGS. 8A and 8B are diagrams each illustrating a positional relationship between a focal plane and a depth of focus of converging rays on a single irradiation member and a plurality of irradiation members.
Figure 8B:
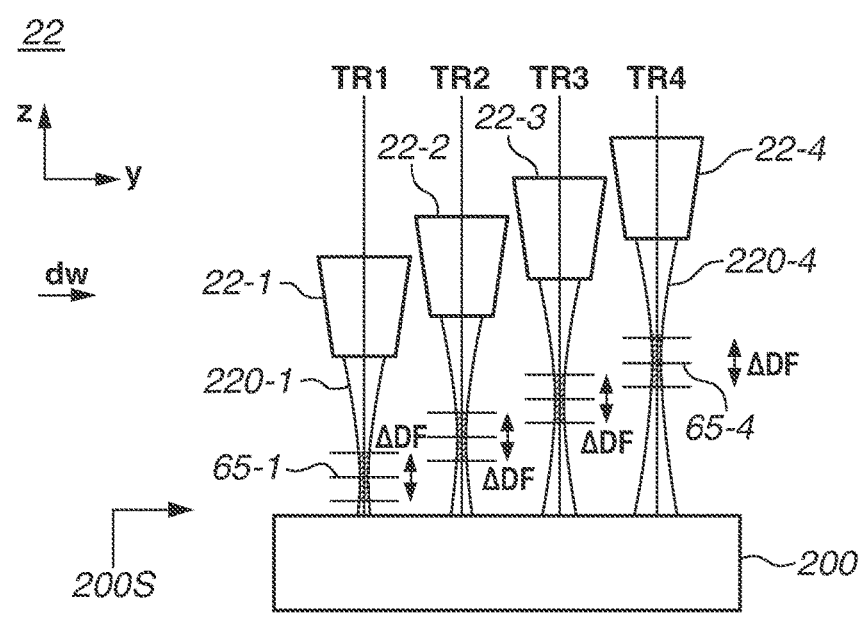

FIG. 8A illustrates a section of the converging ray 220 that is parallel to a y-z plane and forms the focal plane 65 at the position corresponding to the focal length DF from the objective lens 260 in the irradiation unit 22. The converging ray 220 is represented by an area surrounded by a hyperbola on the y-z plane. In the present exemplary embodiment, a light flux diameter condition obtained by multiplying the focus diameter φ by a square root of 2 (SQRT(2)×φ), i.e., the range of the length of the light flux on the optical axis corresponding to a light intensity that is 0.5 times or more the light intensity per unit irradiation area on the focal plane 65 is set as the depth of focus ΔDF.

In a case where the height hi of the specimen 900$i$ corresponds to a position overlapping the depth of focus ΔDF of the irradiated surface 65$k$ corresponding to any one of the conveyance tracks TRk, the specimen 900$i$ is in the in-focus state for any one of the converging rays 220-$k$ (k=1 to 4). Accordingly, the identification apparatuses 1000, 1200, and 1400 according to the first to third exemplary embodiments, respectively, can capture light with a high scattering light intensity and can identify each specimen 900$i$ with a high spectral accuracy even when the specimens 900$i$ have different heights.

Accordingly, as illustrated in FIG. 8B, in a case where the height of the focal plane 65 is shifted such that the depth of focus ΔDF of the focal plane 65-$k$ in each of irradiation members 22-$k$ and 24-$k$ is continuous in the height direction, the identification apparatuses 1000, 1200, and 1400 in which the depth of focus ΔDF is substantially expanded can be provided. The ratio of the depth of focus ΔDF to the focal length DF is limited by the numerical aperture NA of the objective lens 260. However, if multiple rows (K rows) of irradiation units with the focal length DF are formed, the depth of focus that is expanded to a maximum size, i.e., a size that is K times that of the depth of focus can be obtained.

In other words, in a case where the height hi of the specimen 900$i$ corresponds to a position overlapping the depth of focus ΔDF of the focal plane 65-$k$ corresponding to the conveyance track TRk, the height hi of each specimen 900$i$ substantially matches the height of the focal plane 65-$k$ corresponding to the conveyance track TRk. In other words, in a case where the height hi of the specimen 900$i$ corresponds to a position overlapping the depth of focus ΔDF of the focal plane 65-$k$ corresponding to the conveyance track TRk, the height hi of each specimen 900$i$ corresponds to the height of the focal plane 65-$k$ corresponding to the conveyance track TRk.

A modified example in which the placement unit is implemented by combining the static gap gate and the movable gate, the opened or closed state of which is controlled, is included in exemplary embodiments of the identification apparatus according to the present invention.

A mode in which a reflection spectrum (color) of a specimen acquired using a hyperspectral camera as the form information acquisition unit 90 is acquired as a characteristic value for the specimen, and an irradiation condition for the irradiation unit on each conveyance track TRk or a light capturing condition for the light-capturing unit is changed is a modified example of the third exemplary embodiment. It is known that Raman scattering intensities of reflection spectrum in a visible range have a positive correlation. For a black specimen with a low Raman scattering intensity, a deficient spectral identification ability can be relieved by increasing the light intensity per unit irradiation area of converging rays from the irradiation units. Similarly, for a white specimen with a high Raman scattering intensity, the spectral identification ability can be secured by relatively decreasing the light intensity per unit irradiation area of converging rays from the irradiation units so that saturation is less likely to occur in a detector or an amplification unit that amplifies a signal from the detector.

A mode in which a light irradiation unit (not illustrated) that can switch between irradiation and non-irradiation of light including an emission spectrum in a range from a blue color gamut to an ultraviolet color gamut is provided at a position overlapping the image capturing field of view 920 of the form information acquisition unit 90 and fluorescence information is acquired from a specimen can also be adopted as a modified example of the present exemplary embodiment. In this modified example, a mode in which an irradiation condition, such as an irradiation spectrum, from each irradiation unit is changed to correspond to fluorescence information is adopted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-128162, filed Jul. 29, 2020, which is hereby incorporated by reference herein in its entirety.

What is claimed is:

1. An identification apparatus comprising:
a plurality of irradiation units disposed at different positions in a conveyance width direction to irradiate a specimen with a converging ray in different irradiation conditions, the specimen being conveyed in a predetermined conveyance direction by a conveyance unit;
a plurality of light-capturing units configured to capture scattered light from the specimen, each of the plurality of light-capturing units corresponding to a different one of the plurality of irradiation units;
an acquisition unit configured to acquire identification information for identifying a property of the specimen based on the light captured by the light-capturing units; and
a placement unit configured to place the specimen on a position corresponding to any one of the plurality of irradiation units in accordance with a characteristic value of the specimen at an upstream side of the plurality of irradiation units in the conveyance direction,
wherein the conveyance unit includes a plurality of conveyance paths each corresponding to a different one of the plurality of irradiation units in the conveyance width direction.

2. The identification apparatus according to claim 1, wherein the placement unit is disposed at the upstream side of the plurality of irradiation units in the conveyance direction.

3. The identification apparatus according to claim 1, wherein the conveyance unit includes a conveyance surface for conveying and placing the specimen.

4. The identification apparatus according to claim 3, wherein the conveyance width direction is parallel to the conveyance surface and perpendicular to the conveyance direction.

5. The identification apparatus according to claim 1, wherein the plurality of light-capturing units is disposed at different positions in the conveyance width direction, each of the positions corresponding to a different one of the plurality of irradiation units.

6. The identification apparatus according to claim 1, wherein the placement unit places the specimen on any one of the plurality of conveyance paths.

7. The identification apparatus according to claim 1, wherein the characteristic value is at least one of a geometric characteristic, a mechanical characteristic, and an optical characteristic of the specimen.

8. The identification apparatus according to claim 1, wherein the characteristic value is at least one of a height, a width, a length, and a reflection spectrum of the specimen.

9. The identification apparatus according to claim 1, wherein the irradiation condition includes at least one of a height of a focal plane, an irradiation light intensity, an irradiation period, a focal length, and a working distance between the irradiation units.

10. The identification apparatus according to claim 1, further comprising an image acquisition unit configured to acquire a spectral image, the image acquisition unit including a spectral element configured to disperse the light captured by the light-capturing unit, and an image capturing device configured to acquire a spectrum image of the light dispersed by the spectral element.

11. The identification apparatus according to claim 10, further comprising a spectroscopic information acquisition unit configured to acquire spectroscopic information based on the spectrum image and an information reference unit configured to acquire material information in association with the specimen, based on the spectroscopic information.

12. The identification apparatus according to claim 1, wherein the acquisition unit acquires the identification information for identifying the property of the specimen, based on a Raman spectrum included in the scattered light.

13. The identification apparatus according to claim 1, further comprising an image capturing unit configured to capture an image of the specimen.

14. The identification apparatus according to claim 13, wherein the acquisition unit identifies the property of the specimen, based on the image of the specimen acquired from the image capturing unit and the Raman spectrum included in the scatter light.

15. The identification apparatus according to claim 1, further comprising the conveyance unit.

16. The identification apparatus according to claim 1, further comprising an instruction unit configured to output a command for a sorting operation to a sorting device for sorting the specimen, based on the identification information acquired by the acquisition unit.

17. The identification apparatus according to claim 16, further comprising the sorting device.

18. The identification apparatus according to claim 1, wherein the identification information includes information for identifying whether the specimen is a target specimen.

19. An identification apparatus comprising:
a plurality of irradiation units disposed at different positions in a conveyance width direction to irradiate a specimen with a converging ray in different irradiation conditions, the specimen being conveyed in a predetermined conveyance direction by a conveyance unit;
a plurality of light-capturing units configured to capture scattered light from the specimen, each of the plurality of light-capturing units corresponding to a different one of the plurality of irradiation units;
an acquisition unit configured to acquire identification information for identifying a property of the specimen based on the light captured by the light-capturing units; and
a placement unit configured to place the specimen on a position corresponding to any one of the plurality of irradiation units in accordance with a characteristic value of the specimen at an upstream side of the plurality of irradiation units in the conveyance direction, wherein the characteristic value includes a height of the specimen, and the irradiation condition includes a height of a focal plane of the converging ray.

20. The identification apparatus according to claim 19, wherein the placement unit places the specimen at a corresponding position in the conveyance width direction where a height allowing the specimen to pass matches a height of the focal plane of the converging ray from any one of the plurality of irradiation units.

21. An identification apparatus comprising:
a plurality of irradiation units disposed at different positions in a conveyance width direction to irradiate a specimen with a converging ray in different irradiation conditions, the specimen being conveyed in a predetermined conveyance direction by a conveyance unit;
a plurality of light-capturing units configured to capture scattered light from the specimen, each of the plurality of light-capturing units corresponding to a different one of the plurality of irradiation units;
an acquisition unit configured to acquire identification information for identifying a property of the specimen based on the light captured by the light-capturing units; and
a placement unit configured to place the specimen on a position corresponding to any one of the plurality of irradiation units in accordance with a characteristic value of the specimen at an upstream side of the plurality of irradiation units in the conveyance direction, wherein the conveyance unit includes a conveyance surface for conveying and placing the specimen, and wherein the placement unit includes a static gap gate including a portion where a height condition from the conveyance surface for allowing the specimen to pass is different in the conveyance width direction.

22. An identification apparatus comprising:
a plurality of irradiation units disposed at different positions in a conveyance width direction to irradiate a specimen with a converging ray in different irradiation conditions, the specimen being conveyed in a predetermined conveyance direction by a conveyance unit;
a plurality of light-capturing units configured to capture scattered light from the specimen, each of the plurality of light-capturing units corresponding to a different one of the plurality of irradiation units;
an acquisition unit configured to acquire identification information for identifying a property of the specimen based on the light captured by the light-capturing units; and
a placement unit configured to place the specimen on a position corresponding to any one of the plurality of irradiation units in accordance with a characteristic value of the specimen at an upstream side of the plurality of irradiation units in the conveyance direction, wherein the placement unit includes a plurality of movable gates configured to place the specimen at a predetermined position in the conveyance width direction in accordance with a height of the specimen.

23. The identification apparatus according to claim 22, further comprising a gate control unit configured to output a command signal for controlling an opened and closed state of each of the plurality of movable gates.

* * * * *